United States Patent
Lao et al.

(10) Patent No.: US 10,540,484 B2
(45) Date of Patent: Jan. 21, 2020

(54) NETWORKED SERVICES LICENSING SYSTEM AND METHOD

(71) Applicant: ContentGuard Holdings, Inc., Plano, TX (US)

(72) Inventors: Guillermo Lao, Torrance, CA (US); Manuel Ham, Downey, CA (US); Eddie J Chen, Rancho Palos Verdes, CA (US); Thomas Soestini, Los Angeles, CA (US); Charles P Gilliam, Darien, CT (US); Michael Raley, Downey, CA (US); Bijan Tadayon, Germantown, MD (US); Xin Wang, Torrance, CA (US)

(73) Assignee: CONTENTGUARD HOLDINGS, INC., Plano, TX (US)

( * ) Notice: Subject to any disclaimer, the term of this patent is extended or adjusted under 35 U.S.C. 154(b) by 304 days.

(21) Appl. No.: 14/531,958

(22) Filed: Nov. 3, 2014

(65) Prior Publication Data

US 2015/0059005 A1 Feb. 26, 2015

Related U.S. Application Data

(63) Continuation of application No. 10/374,729, filed on Feb. 27, 2003, now abandoned, which is a
(Continued)

(51) Int. Cl.
  *G06F 21/10* (2013.01)
  *H04L 29/06* (2006.01)

(52) U.S. Cl.
  CPC .............. *G06F 21/10* (2013.01); *H04L 63/08* (2013.01); *H04L 63/0823* (2013.01);
(Continued)

(58) Field of Classification Search
  CPC .................................................. G06Q 2220/18
(Continued)

(56) References Cited

U.S. PATENT DOCUMENTS

| 4,278,837 | A | 7/1981 | Best |
| 4,658,093 | A | 4/1987 | Hellman |

(Continued)

FOREIGN PATENT DOCUMENTS

| EP | 0268139 A2 | 5/1988 |
| EP | 0567800 A1 | 11/1993 |

OTHER PUBLICATIONS

U.S. Appl. No. 60/331,625, filed Nov. 20, 2001.
(Continued)

*Primary Examiner* — Chinedu C Agwumezie
(74) *Attorney, Agent, or Firm* — Rimon PC; Marc Kaufman

(57) ABSTRACT

A method, system, and computer program product for controlling consumption of a distributed network service in accordance with rights expression information associated with the distributed network service and specifying a manner of use of the distributed network service, including interpreting the rights expression information associated with the distributed network service, the rights expression information indicating a manner of use of the distributed network service; and controlling consumption of the distributed network service based on the rights expression information.

15 Claims, 21 Drawing Sheets

Related U.S. Application Data continuation-in-part of application No. 10/159,272, filed on Jun. 3, 2002, now Pat. No. 7,028,009, which is a continuation-in-part of application No. 10/046,695, filed on Jan. 17, 2002, now Pat. No. 7,085,741.

(60) Provisional application No. 60/359,667, filed on Feb. 27, 2002, provisional application No. 60/331,625, filed on Nov. 20, 2001, provisional application No. 60/296,118, filed on Jun. 7, 2001, provisional application No. 60/296,117, filed on Jun. 7, 2001, provisional application No. 60/296,113, filed on Jun. 7, 2001, provisional application No. 60/261,753, filed on Jan. 17, 2001.

(52) U.S. Cl.
CPC ............. *H04L 63/10* (2013.01); *H04L 63/20* (2013.01); *G06F 2221/07* (2013.01); *H04L 2463/101* (2013.01)

(58) Field of Classification Search
USPC .......................................................... 705/59
See application file for complete search history.

(56) References Cited

U.S. PATENT DOCUMENTS

| | | | |
|---|---|---|---|
| 4,937,863 A | 6/1990 | Robert et al. | |
| 4,977,594 A | 12/1990 | Shear | |
| 5,109,413 A | 4/1992 | Comerford et al. | |
| 5,204,897 A | 4/1993 | Wyman | |
| 5,260,999 A | 11/1993 | Wyman | |
| 5,412,717 A | 5/1995 | Fischer | |
| 5,477,263 A | 12/1995 | O'Callaghan et al. | |
| 5,557,518 A | 9/1996 | Rosen | |
| 5,629,980 A | 5/1997 | Stefik et al. | |
| 5,634,012 A | 5/1997 | Stefik et al. | |
| 5,673,316 A | 9/1997 | Auerbach et al. | |
| 5,717,604 A | 2/1998 | Wiggins | |
| 5,892,900 A | 4/1999 | Ginter et al. | |
| 5,940,504 A | 8/1999 | Griswold | |
| 6,044,466 A | 3/2000 | Anand et al. | |
| 6,135,646 A | 10/2000 | Kahn et al. | |
| 6,226,618 B1 | 5/2001 | Downs et al. | |
| 6,311,207 B1 * | 10/2001 | Mighdoll ................. | G06F 8/65 348/E5.105 |
| 6,327,652 B1 | 12/2001 | England et al. | |
| 6,331,207 B1 * | 12/2001 | Gebhardt .................. | 106/751 |
| 6,389,538 B1 | 5/2002 | Gruse et al. | |
| 6,678,733 B1 * | 1/2004 | Brown ................ | H04L 63/0209 709/203 |
| 6,708,157 B2 | 3/2004 | Stefik et al. | |
| 6,963,859 B2 | 11/2005 | Stefik et al. | |
| 7,225,160 B2 | 5/2007 | Stefik et al. | |
| 7,269,576 B2 | 9/2007 | Stefik et al. | |
| 7,523,072 B2 | 4/2009 | Stefik et al. | |
| 7,774,280 B2 | 8/2010 | Wang et al. | |
| 8,001,053 B2 | 8/2011 | Nguyen et al. | |
| 8,001,054 B1 | 8/2011 | Peart et al. | |
| 8,370,956 B2 | 2/2013 | Stefik et al. | |
| 8,393,007 B2 | 3/2013 | Stefik et al. | |
| 2002/0077984 A1 | 6/2002 | Ireton | |
| 2005/0060266 A1 * | 3/2005 | DeMello ................. | G06F 21/10 705/57 |

OTHER PUBLICATIONS

*Volusion, Inc.* v. *Versata Software, Inc. et al.*, CBM2013-00017, Paper No. 8 (Oct. 24, 2013).
Weingart S., Physical Security for the μABYSS System, Proceedings of the IEEE Symposium on Security and Privacy (Apr. 27-29, 1987).
White, S., et al., ABYSS: A Trusted Architecture for Software Protection, IEEE (1987).
William Aspray, The Stored Program Concept, IEEE Spectrum Sep. 1990.
*ZTE Corp. and ZTE (USA) Inc.* v. *ContentGuard Holdings*, IPR2013-00133, Paper No. 61 (Jul. 1, 2014).
File History for U.S. Pat. No. 8,001,053, Nov. 22, 2011 Amendment After Final Rejection.
File History of U.S. Pat. No. 6,135,646 filed Feb. 28, 1997.
File History of U.S. Pat. No. 6,963,859 filed Jan. 16, 2003.
File History of U.S. Pat. No. 7,225,160 filed Dec. 17, 2001.
File History of U.S. Pat. No. 7,269,576 filed Feb. 9, 2004.
File History of U.S. Pat. No. 7,523,072 filed Dec. 16, 2005.
File History of U.S. Pat. No. 7,774,280 filed Oct. 4, 2004.
File History of U.S. Pat. No. 8,001,053 filed Oct. 4, 2004.
File History of U.S. Pat. No. 8,370,956 filed Aug. 13, 2012.
File History of U.S. Pat. No. 8,393,007 filed Aug. 14, 2012.
File History of U.S. Appl. No. 08/967,084 & U.S. Appl. No. 08/344,760, filed Nov. 10, 1997 & filed Nov. 23, 1994.
File History of U.S. Appl. No. 09/778,001, filed Feb. 7, 2001.
Final Decision in *ZTE Corporation and ZTE (USA) Inc.* v. *ContentGuard Holdings Inc.*, IPR2013-00133, Paper 61 (Jul. 1, 2014).
Final Decision in *ZTE Corporation and ZTE (USA) Inc.* v. *ContentGuard Holdings Inc.*, IPR2013-00137, Paper 58 (Jul. 1, 2014).
Final Decision in *ZTE Corporation and ZTE (USA) Inc.* v. *ContentGuard Holdings Inc.*, IPR2013-00139, Paper 57 (Jun. 26, 2014).
Final Office Action dated Apr. 17, 2006 for U.S. Appl. No. 10/956,070, filed Oct. 4, 2004.
Final Office Action dated Apr. 17, 2008 for U.S. Appl. No. 10/162,701, filed Jun. 6, 2002.
Final Office Action dated Aug. 19, 2009 for U.S. Appl. No. 10/956,121, filed Oct. 4, 2004.
Final Office Action dated May 24, 2006 for U.S. Appl. No. 10/162,701, filed Jun. 6, 2002.
Glenn C. Reid, Thinking in Postscript, Addison-Wesley (1990).
*Google Inc.* v. *Inventor Holdings, LLC*, CBM2014-00002, Paper No. 16 (Apr. 1, 2014).
*Hulu, LLC* v. *Intertainer, Inc.* Case CBM2014-00053, Paper 11 (Jun. 23, 2014).
Iannella, R., Open Digital Rights Language (ODRL), Version 7, http://xml.coverpages.org/ODRL-07.pdf (Oct. 13, 2000).
Internet Dreams Archetypes, Myths, and Metaphors—Stefik foreword.
Kahin, Brian, The Strategic Environment for Protecting Multimedia, IMA Intellectual Property Project Proceedings, Jan. 1994.
Kahn R.E., et al., "The Digital Library Project, vol. 1: The World of Knowbots (Draft), An Open Architecture for a Digital Library System and a Plan for its Development," Corporation for National Research Initiatives, Mar. 1988, pp. 1-48.
"Law Borrowing & Returning," The University of Chicago, available at http://www.lib.uchicago.edu/e/law/usig/borrow/.
Linn R.J., et al., "Copyright and Information Services in the Context of the National Research and Education Network. sup.1," Ima Intellectual Property Project Proceedings, 1994, vol. 1 (1), pp. 9-20.
Microsoft Computer Dictionay (5th Ed.) (2002).
Moffett J., et al., Specifying Discretionary Access Control Policy for Distributed Systems, Computer Communications, vol. 13(9), pp. 571-580 (Nov. 1990).
Mori, R., Superdistribution: The Concept and Architecture, The Transactions of the Institute of Electronics, Information and Comm. Engineers (Jul. 1990), No. 7, pp. 1133.
Morin, J., Commercialization of Electronic Information, Journal of Organizational and End User Computing, vol. 12, Issue 2 (Apr. 1, 2000).
Needham & Schroeder, Using Encryption for Authentication in Large Networks of Computers (Dec. 1978).
Non-Final Office Action dated Aug. 10, 2007 for U.S. Appl. No. 10/162,701, filed Jun. 6, 2002.
Non-Final Office Action dated Apr. 15, 2008 for U.S. Appl. No. 10/956,121, filed Oct. 4, 2004.
Non-Final Office Action dated Oct. 21, 2005 for U.S. Appl. No. 10/162,701, filed Jun. 6, 2002.

(56) References Cited

OTHER PUBLICATIONS

Non-Final Office Action dated Oct. 25, 2005 for U.S. Appl. No. 10/956,070, filed Oct. 4, 2004.
Notice of Abandonment dated May 2, 2011 for U.S. Appl. No. 10/162,701, filed Jun. 6, 2002.
Office Patent Trial Practice Guide, 77 Fed. Reg. 157 (Aug. 14, 2012).
Perritt H.H., Jr., "Knowbots Permissions Headers and Contract Law" Technological Strategies for Protecting Intellectual Property in the Networked Multimedia Environment, pp. 1-22,[Online] (Apr. 2-3, 1993 with revisions of Apr. 30, 1993). XP002233403 Retrieved from the Internet: <URL:http://www.ifla.org/documents/infopol/copyright/perh2.txt>.
Petition for Covered Business Method Patent Review (CBM Case No. CBM2015-00040) of U.S. Pat. No. 7,774,280 filed Dec. 10, 2014.
Petition for Covered Business Method Patent Review (CBM Case No. CBM2015-00043) of U.S. Pat. No. 8,001,053 filed Dec. 10, 2014.
Petition for Inter Partes Review (IPR Case No. IPR2015-00351) of U.S. Pat. No. 7,774,280 filed Dec. 10, 2014.
Petition for Inter Partes Review (IPR Case No. IPR2015-00352) of U.S. Pat. No. 7,774,280 filed Dec. 10, 2014.
Petition for Inter Partes Review (IPR Case No. IPR2015-00353) of U.S. Pat. No. 7,774,280 filed Dec. 10, 2014.
Petition for Inter Partes Review (IPR Case No. IPR2015-00354) of U.S. Pat. No. 7,774,280 filed Dec. 10, 2014.
Petition for Inter Partes Review (IPR Case No. IPR2015-00355) of U.S. Pat. No. 8,001,053 filed Dec. 10, 2014.
Petition for Inter Partes Review (IPR Case No. IPR2015-00356) of U.S. Pat. No. 8,001,053 filed Dec. 10, 2014.
Petition for Inter Partes Review (IPR Case No. IPR2015-00357) of U.S. Pat. No. 8,001,053 filed Dec. 10, 2014.
Petition for Inter Partes Review (IPR Case No. IPR2015-00358) of U.S. Pat. No. 8,001,053 filed Dec. 10, 2014.
*Alice Corp. Pty. Ltd. v. CLS Bank Int'l*, 134 S.Ct. 2347 (Jun. 19, 2014).
American Heritage Dictionary Third Edition.
Amir Herzberg, Shlomit S. Pinter, "Public Protection of Software," in Advances in Cryptology: Proc. Crypto 85, Hugh C. Williams (ed.), pp. 158 (1986).
*Apple Inc. v. Sightsound Techs., LLC*, CBM2013-00019, Paper No. 17 (Oct. 8, 2013).
*Bloomberg Inc. et al.v. Markets-Alert PTY LTD*, CBM2013-00005, Paper No. 18 (Mar. 29, 2013).
Board of Patent Appeals and Interferences Decision on Appeal, U.S. Appl. No. 10/162,701, filed Jul. 27, 2010.
Bray et al., "Extensible Markup Language (XML) 1.0," W3C Recommendation, Feb. 10, 1998.
Bruce Schneier, Applied Cryptography (Chapters 1-3, 7, 12, 13, 17)—1994.
Cina V., et al., ABYSS: A Basic Yorktown Security System: PC Asset Protection Concepts, IBM Research Report No. RC 12401 (Dec. 1986).
CNRI Workshop on the Protection of Intellectual Property Rights in a Digital Library System May 18-19, 1989.
Comparison of Specification of U.S. Appl. No. 08/967,084 to Specification of U.S. Appl. No. 09/778,001.
Comparison of Specification of U.S. Appl. No. 09/778,001 to Specification of U.S. Pat. No. 7,225,160.
Comparison of Stefik '980 Patent to Specification of U.S. Appl. No. 09/778,001.
Complaint, *ContentGuard Holdings, Inv. V. Google Inc.*, Case No. 2:14-cv-00061-JRG-RSP (E.D. Tex.), Dkt. No. 1.
Congressional Record—Senate, 157 Cong. Rec. S1360-1394 (daily ed. Mar. 8, 2011) (Sen. Schumer).
ContentGuard's Opening Claim Construction Brief, 2:13-cv-01112 (EDTX) Dkt No. 304.
Curriculum Vitae for Alan Sherman.
Curriculum Vitae of Atul Prakash.

D. Denning, Cryptography and Data Security (1982).
Data networks and open system communicationjs X.509 Standard.
Davida G., et al., Defending Systems Against Viruses through Cryptographic Authentication, IEEE 1989.
Decision on Appeal, U.S. Appl. No. 10/162,212 (BPAI) mailed Dec. 16, 2009.
Decision to Institute in *ZTE Corporation and ZTE (USA) Inc. v. ContentGuard Holdings Inc.*, IPR2013-00133, Paper 15 (Jul. 1, 2013).
Decision to Institute in *ZTE Corporation and ZTE (USA) Inc. v. ContentGuard Holdings Inc.*, IPR2013-00134, Paper 12 (Jun. 19, 2013).
Decision to Institute in *ZTE Corporation and ZTE (USA) Inc. v. ContentGuard Holdings Inc.*, IPR2013-00136, Paper 11 (Jul. 16, 2013).
Decision to Institute in *ZTE Corporation and ZTE (USA) Inc. v. ContentGuard Holdings Inc.*, IPR2013-00137, Paper 17 (Jul. 1, 2013).
Decision to Institute in *ZTE Corporation and ZTE (USA) Inc. v. ContentGuard Holdings Inc.*, IPR2013-00138, Paper 17 (Jul. 1, 2013).
Decision to Institute in *ZTE Corporation and ZTE (USA) Inc. v. ContentGuard Holdings Inc.*, IPR2013-00139, Paper 15 (Jul. 9, 2013).
Declaration of Alan Sherman, Ph. D. regarding patent 160.
Declaration of Alan Sherman, Ph. D. regarding patents 859, 072, 956, 007, 576.
Declaration of Atul Prakash "System and Method for Managing Transfer of Rights Using Shared State Variables".
Declaration of Benjamin Goldberg, Ph.D.
Declaration of Dr. Goodrich in support of ContentGuard's Opening Claim Construction Brief—Exhibit K of Doc. No. 304.
Definition of "Meta," Oxford English Dictionary www.oxforddictionaries.com/definition/english/meta.
Definition of "Processor," the American Heritage® Dictionary of the English Language, Fourth Edition, 2000 Houghton Mifilin Company, available at http://www.thefreedictionary.com/processor.
Definition of "Right," Merriam-Webster Online Dictionary, available at http://www.merriam-webster.com/dictionary/right.
Definition of "Variable," The Free Dictionary, available at http://www.thefreedictionary.com/variable+%28computer+science%29.
Diffie-Hellman, "New Directions in Cryptography," IEEE Transactions on Information Theory, vol. IT-22, No. 6, Nov. 1976.
*EBay, Inc. v. Paid, Inc.*, CBM2014-00125, Paper No. 15 (Sep. 30, 2014).
Electronic Books Exchange (EBX) Specification 0.8 (Jul. 2000).
*Experian Marketing Solutions, Inc. v. RPost Communications Ltd.*, CBM2014-00010, Paper No. 20 (Apr. 22, 2014).
Federal Information Processing Standards Publication PUB 140-1,dated Jan. 11, 1994.
File History for U.S. Appl. No. 10/163,634, filed Feb. 18, 2010 Decision on Appeal.
File History for U.S. Pat. No. 7,774,280, Dec. 29, 2008 Non-Final Rejection.
File History for U.S. Pat. No. 7,774,280, Mar. 29, 2010 Notice of Allowance.
File History for U.S. Pat. No. 7,774,280, May 28, 2009 Applicant Response to Final Rejection.
File History for U.S. Pat. No. 8,001,053, Aug. 13, 2008 Applicant Appeal Brief.
File History for U.S. Pat. No. 8,001,053, Feb. 28, 2007 Amendment After Non-Final Rejection Response to Office Action.
File History for U.S. Pat. No. 8,001,053, Mar. 16, 2010 Supplemental Examiner's Answer to Appeal Brief.
File History for U.S. Pat. No. 8,001,053, May 17, 2010 Response to Supplemental Examiner's Answer.
Petition for Inter Partes Review (IPR Case No. IPR2015-00440) of U.S. Pat. No. 6,963,859 filed Dec. 22, 2014.
Petition for Inter Partes Review (IPR Case No. IPR2015-00441) of U.S. Pat. No. 6,963,859 filed Dec. 22, 2014.
Petition for Inter Partes Review (IPR Case No. IPR2015-00442) of U.S. Pat. No. 6,963,859 filed Dec. 22, 2014.

(56) References Cited

OTHER PUBLICATIONS

Petition for Inter Partes Review (IPR Case No. IPR2015-00443) of U.S. Pat. No. 7,523,072 filed Dec. 22, 2014.
Petition for Inter Partes Review (IPR Case No. IPR2015-00444) of U.S. Pat. No. 7,523,072 filed Dec. 22, 2014.
Petition for Inter Partes Review (IPR Case No. IPR2015-00445) of U.S. Pat. No. 7,523,072 filed Dec. 22, 2014.
Petition for Inter Partes Review (IPR Case No. IPR2015-00446) of U.S. Pat. No. 8,370,956 filed Dec. 22, 2014.
Petition for Inter Partes Review (IPR Case No. IPR2015-00447) of U.S. Pat. No. 8,370,956 filed Dec. 22, 2014.
Petition for Inter Partes Review (IPR Case No. IPR2015-00448) of U.S. Pat. No. 8,370,956 filed Dec. 22, 2014.
Petition for Inter Partes Review (IPR Case No. IPR2015-00449) of U.S. Pat. No. 8,393,007 filed Dec. 22, 2014.
Petition for Inter Partes Review (IPR Case No. IPR2015-00450) of U.S. Pat. No. 8,393,007 filed Dec. 22, 2014.
Petition for Inter Partes Review (IPR Case No. IPR2015-00451) of U.S. Pat. No. 8,393,007 filed Dec. 22, 2014.
Petition for Inter Partes Review (IPR Case No. IPR2015-00452) of U.S. Pat. No. 7,269,576 filed Dec. 22, 2014.
Petition for Inter Partes Review (IPR Case No. IPR2015-00453) of U.S. Pat. No. 7,269,576 filed Dec. 22, 2014.
Petition for Inter Partes Review (IPR Case No. IPR2015-00454) of U.S. Pat. No. 7,269,576 filed Dec. 22, 2014.
Petition for Inter Partes Review (IPR Case No. IPR2015-00455) of U.S. Pat. No. 7,269,576 filed Dec. 22, 2014.
Petition for Inter Partes Review (IPR Case No. IPR2015-00456) of U.S. Pat. No. 7,269,576 filed Dec. 22, 2014.
Petition for Inter Partes Review (IPR Case No. IPR2015-00457) of U.S. Pat. No. 7,225,160 filed Dec. 22, 2014.
Petition for Inter Partes Review (IPR Case No. IPR2015-00458) of U.S. Pat. No. 7,225,160 filed Dec. 22, 2014.
Proceedings of the Technological Strategies for Protecting Intellectual Property in the Networked Multimedia Environment, Journal of the Interactive Multimedia Association Intellectual Property Project (Jan. 1, 1994).
Record of Oral Hearing, Sessions 1 and 2, in *ZTE Corporation and ZTE (USA) Inc. v. ContentGuard Holdings Inc.*, IPR2013-00138, Paper 54.
Remarks in Amendment of U.S. Appl. No. 10/956,070 dated Jul. 17, 2006.
Remarks in Amendment of U.S. Appl. No. 10/956,070 dated Nov. 22, 2010.
Remarks in Amendment of U.S. Appl. No. 10/956,070 dated Jan. 24, 2006.
Remarks in Amendment of U.S. Appl. No. 10/956,070 dated Oct. 31, 2007.
Remarks in Amendment of U.S. Appl. No. 10/956,121 dated Mar. 15, 2010.
Remarks in Amendment of U.S. Appl. No. 10/956,121 dated May 28, 2009.
RFC 1422, Privacy Enhanced Mail (PEM) Part II: Certificate-Based Key Management, 1993.
S. White & L. Comerford, ABYSS: A Trusted Architecture for Software Protection (1990).
*Salesforce.com, Inc. v. Virtualagility, Inc.*, CBM2013-00024, Paper No. 47 (Sep. 16, 2014).
Saltzer J.,& M. Schroeder, The Protection of Information in Computer Systems, Proceedings of the IEEE, vol. 63, No. 9 (Sep. 1975).
Samuelson P., et al, "Intellectual Property Rights for Digital Library and Hypertext Publishing Systems: An Analysis of Xanadu," Hypertext '91 Proceedings of the Third Annual ACM Conference on Hypertext, Dec. 1991, pp. 39-50.
*SAP America, Inc. v. Versata Dev. Group, Inc.*, CBM2012-00001, Paper 36 (Jan. 9, 2013).
*SAP America, Inc. v. Versata Development Group, Inc.*, CBM2012-00001, Paper No. 70 (Jun. 11, 2013).
Steiner et al., Kerberos: An Authentication Service for Open Network Systems (MIT 1988).
Summons in Case No. 2:13-CV-01112.
T. Berners-Lee & D. Connolly, RFC 1866, Hypertext Markup Language v2.0 (Nov. 1995).
Protection Wars, PC Magazine Cover, Table of contents, 164-182, 1986.
The Digital Property Rights Language—Manual and Tutorial—XML Edition, Version 2, http://xml.coverpages.org/DPRLmanual-XML2.html (Nov. 13, 1998).
Tygar J.D., et al., "Dyad: A System for Using Physically Secure Coprocessors," Ima Intellectual Property Project Proceedings, 1994, vol. 1 (1), pp. 121-152.
*Ultramercial, Inc. et al. v. Hulu, LLC et al.*, 2010-1544 (Fed Cir. Nov. 14, 2014).
U.S. Continuation-in-Part U.S. Appl. No. 09/867,745, filed May 31, 2001.
U.S. Continuation-in-Part U.S. Appl. No. 10/162,212, filed Jun. 5, 2002.
U.S. Continuation-in-Part U.S. Appl. No.10/162,701, filed Jun. 6, 2002.
U.S. Appl. No. 60/296,113, filed Jun. 7, 2001.
U.S. Appl. No. 60/296,117, filed Jun. 7, 2001.
U.S. Appl. No. 60/296,118, filed Jun. 7, 2001.
U.S. Appl. No. 60/331,621, filed Nov. 20, 2001.
U.S. Appl. No. 60/331,623, filed Nov. 20, 2001.
U.S. Appl. No. 60/331,624, filed Nov. 20, 2001.

\* cited by examiner

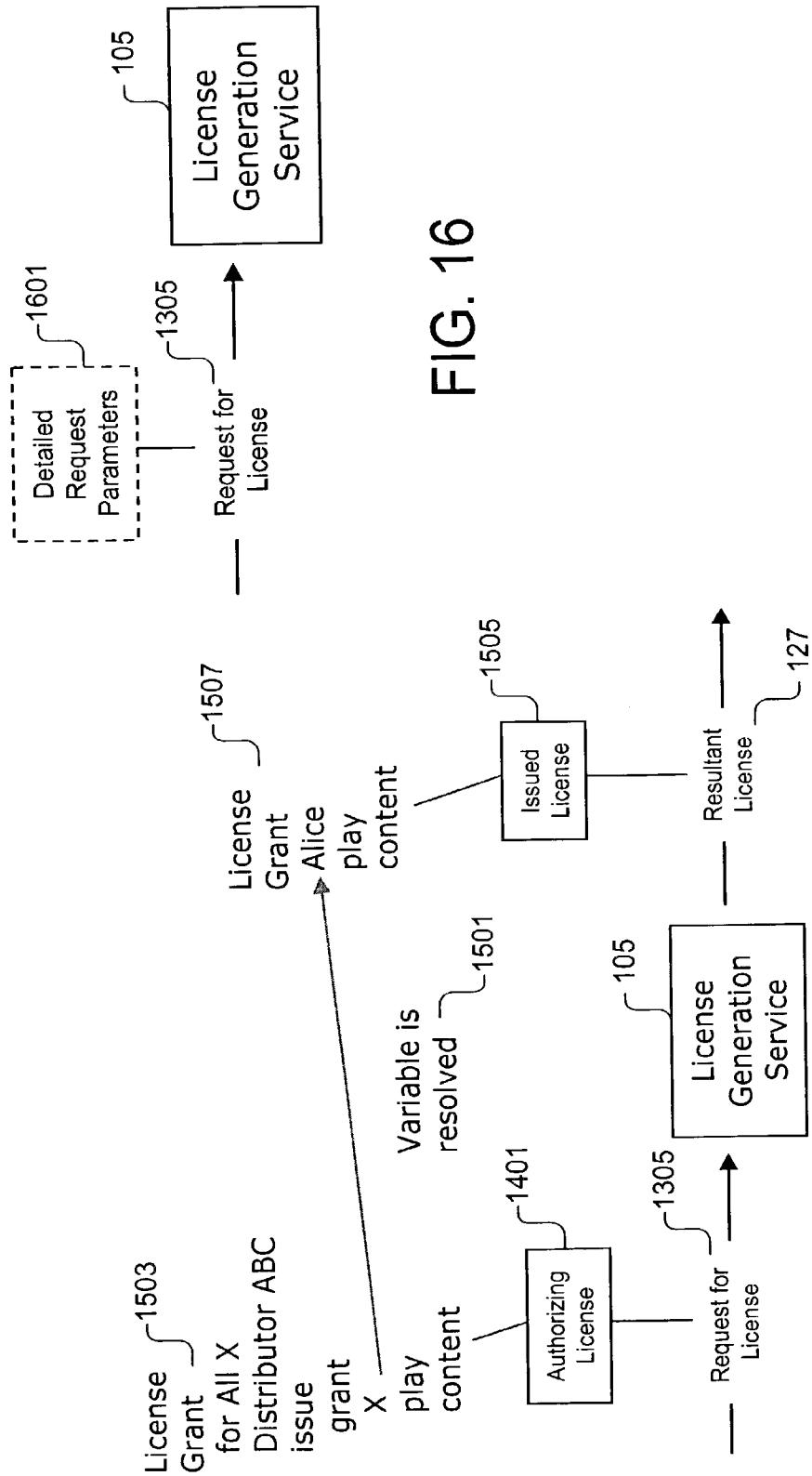

NETWORKED SERVICES LICENSING SYSTEM AND METHOD

CROSS REFERENCE TO RELATED DOCUMENTS

The present application is a Continuation of U.S. patent application Ser. No. 10/374,729 filed on Feb. 27, 2003 (which claims benefit of priority under 35 U.S.C. § 119(e) to commonly assigned, U.S. Provisional Patent Application Ser. No. 60/359,667 of Lao et al., entitled "XrML FRAMEWORK FOR WEB SERVICES," filed on Feb. 27, 2002), which is a Continuation-In-Part (CIP) of commonly assigned, U.S. patent application Ser. No. 10/159,272 of Wang et al., entitled "METHOD AND APPARATUS FOR DISTRIBUTING ENFORCEABLE PROPERTY RIGHTS," filed on Jun. 3, 2002 (which claims benefit of priority to commonly assigned U.S. Provisional Patent Application Ser. Nos. 60/331,625, filed on Nov. 20, 2001, 60/296,117, filed on Jun. 7, 2001, 60/296,118, filed on Jun. 7, 2001, and 60/296,113, filed on Jun. 7, 2001), and which is Continuation-In-Part (CIP) of commonly assigned U.S. patent application Ser. No. 10/046,695, filed on Jan. 17, 2002, which claims benefit of priority to commonly assigned U.S. Provisional Patent Application Ser. No. 60/261,753, filed on Jan. 17, 2001, the entire disclosures of all of which are hereby incorporated by reference herein.

BACKGROUND OF THE INVENTION

Field of the Invention

This invention generally relates to networked communications systems, and more particularly to a system and method for licensing of networked services, such as Web services, and the like.

Description of Related Art

Recently, networked services technologies, such as Web services technologies, are introducing at a rapid pace the capability to access various services over the Internet in an interoperable and automated manner. As enterprises make their content (such as software) and services available as networked services, there exists a need to control their indiscriminate access and use. The typical method of access control has been one where an identity or credentials about an identity are matched against a set of policies that are managed locally by the provider of the service. One example is when a user enters a user name and password to access some resource in a Web service. This method of access control is widely used in computer systems and is primarily about protecting "my" services against unauthorized use. In other words, access to a service typically is solely based on an identity of a user requesting access to the service.

With a desire to manage or restrict access, proliferate and commercialize services, there exist scenarios where computational environments are merely intermediaries and typically cannot decide on their own security policies. An example of such intermediaries includes hosting and replicating devices used in outsourcing and bandwidth management scenarios. However, in such environments, it is difficult to propagate and manage central security policies. Accordingly, there is still a need for systems and methods for licensing of networked services, such as Web services.

SUMMARY OF THE INVENTION

The above and other needs are addressed by exemplary embodiments of the present invention, which provide an improved system and method for licensing of networked services, such as Web services, and the like.

Accordingly, in an exemplary embodiment, there is provided an improved method for controlling consumption of a distributed network service in accordance with rights expression information associated with the distributed network service and specifying a manner of use of the distributed network service. The method includes determining the rights expression information associated with the distributed network service, the rights expression information indicating a manner of use of the distributed network service; and controlling consumption of the distributed network service based on the rights expression information.

According to another exemplary embodiment, there is provided an improved computer system for controlling consumption of a distributed network service in accordance with rights expression information associated with the distributed network service and specifying a manner of use of the distributed network service. The computer system includes a distributed network services provider configured to provide the distributed network service; a client of the provider configured to consume the distributed network service; a license issuing server configured to determine the rights expression information associated with the distributed network service, the rights expression information indicating a manner of use of the distributed network service; and a license issuing server configured to control consumption of the distributed network service based on the rights expression information.

According to a further exemplary embodiment, there is provided an improved computer-readable medium carrying one or more sequences of one or more instructions for controlling consumption of a distributed network service in accordance with rights expression information associated with the distributed network service and specifying a manner of use of the distributed network service. The one or more sequences of one or more instructions including instructions which, when executed by one or more processors, cause the one or more processors to perform the steps of determining the rights expression information associated with the distributed network service, the rights expression information indicating a manner of use of the distributed network service; and controlling consumption of the distributed network service based on the rights expression information.

According to a still further exemplary embodiment, there is provided an improved system for controlling consumption of a distributed network service in accordance with rights expression information associated with the distributed network service and specifying a manner of use of the distributed network service, including means for determining the rights expression information associated with the distributed network service, the rights expression information indicating a manner of use of the distributed network service; and means for controlling consumption of the distributed network service based on the rights expression information.

Still other aspects, features, and advantages of the present invention are readily apparent from the following detailed description, simply by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 15 illustrates an exemplary method for license generation, based on an exemplary a license prototype, that can be used in the Networked Services Licensing System of FIG. 1, according to an exemplary embodiment;

FIG. 16 illustrates an exemplary method for license generation, from scratch, that can be used in the Networked Services Licensing System of FIG. 1, according to an exemplary embodiment;

DETAILED DESCRIPTION OF THE INVENTION

Figure 1:
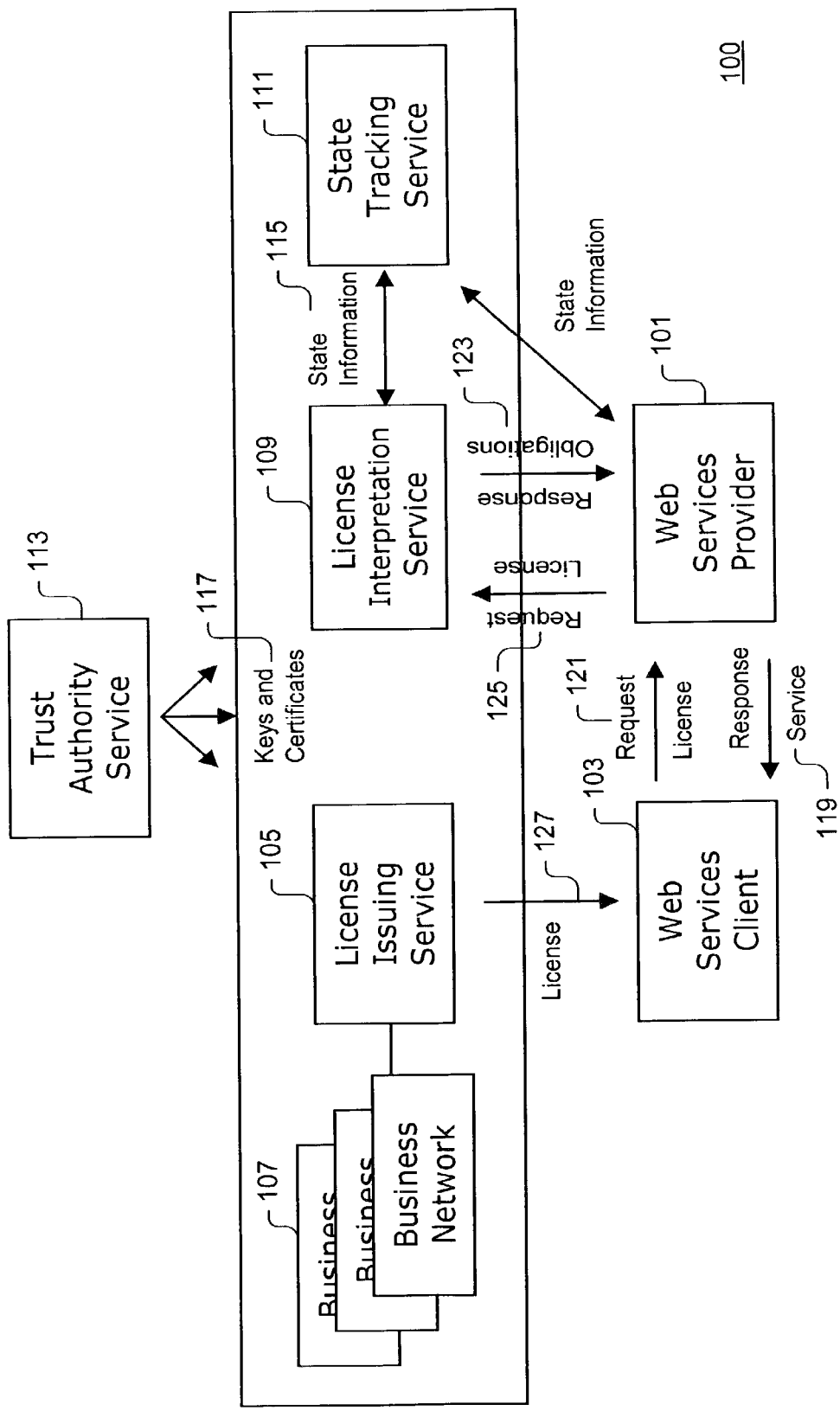
FIG. 1 is a schematic illustration of an exemplary Networked Services Licensing System, according to an exemplary embodiment.

A system and method for licensing of networked services, such as Web services, and the like, are described. In the following description, for purposes of explanation, numerous specific details are set forth in order to provide a thorough understanding of the present invention. It is apparent to one skilled in the art, however, that the present invention can be practiced without these specific details or with equivalent arrangements. In some instances, well-known structures and devices are shown in block diagram form in order to avoid unnecessarily obscuring the present invention.

Generally, a more flexible method for access control can be developed through technologies, referred to as Digital Rights Management (DRM) herein, wherein access to a resource is controlled by a license, wherein the license can be encoded in a rights language. The exemplary embodiments described herein, advantageously, leverage DRM system components to address issues related to the licensing of networked services, such as Web services. Accordingly, the exemplary embodiments can employ authentication, authorization, accounting, payment and financial clearing, rights specification, rights verification, rights enforcement, document protection components, and the like, of a Digital Rights Management system, for example, as further described in commonly assigned U.S. Pat. Nos. 5,530,235, 5,629,980, 5,634,012, 5,638,443, 5,715,403, 6,233,684, and 6,236,971, the entire disclosures of all of which are hereby incorporated by reference herein.

The use of a rights expression, for example, in the form of a license used to define usage rights for specifying a permitted manner of use, such as consumption, and the like, of a service, advantageously, switches the control, the responsibility for control, and the like, from the computing environment to the rightful owner of the service. Such usage rights can be associated with one or more conditions, such as payment, and the like, that can be a prerequisite for exercising the specified manner of use of the service. A rights expression language, such as eXtensible Rights Markup Language (XrML), and the like, for example, including predefined syntax and semantics, can be employed to express the usage rights. Consume, consuming, consumption, and the like, of the service, for example, can include access to or use of the service, access to or use of parts or devices of the service, access to or use of results of the service, receiving or rendering content of the service, executing software of the service, and the like.

In the above model, according to the exemplary embodiments, access control typically is about deploying "my" services "out-there," while at the same time issuing rights to users of such services to control access to the services. By contrast, other methods and systems for access control primarily are focused on protecting "my" services against use by others.

According to the exemplary embodiments, DRM is employed in a networked services environment, such as a Web services environment, for example, by leveraging components of the DRM system, such as license generation, license interpretation, and the like. In addition, the exemplary embodiments provide a system and method for authorization for networked services, for example, through a license expressed in a rights language. Further, the exemplary embodiments are directed how a license can be generated, used, processed, and the like, by the various entities of the networked services ecosystem to reach an authorization decision that allows access by a client, devices, services, and the like, to the networked services. In general, a requester of for a service presents a license in order to get access to the service.

Accordingly, the exemplary embodiments, advantageously, enable more flexible business models. For example, a service can be deployed "anywhere," and the control to access the service can be centralized and determined by the owner of the service. The points of deployment typically do not have to worry about establishing local security policies, as this becomes unnecessary. In addition, the model of "distributed access management" of the exemplary embodiments, advantageously, can be applied in the syndication of networked services, such as Web services, for example, including multiple layers of participants.

Referring now to the drawings, wherein like reference numerals designate identical or corresponding parts throughout the several views, and more particularly to FIG. 1 thereof, there is illustrated an exemplary Networked Services Licensing System 100 that can be used in connection with the described exemplary embodiments for licensing of networked services, such as Web services, and the like. In FIG. 1, the Networked Services Licensing System 100, for example, includes a Web Services Provider 101, a Web Services Client 103, a License Generation and Issuing Service 105 and that can interface with one or more Business Networks 107, a License Generation, Validation and/or Interpretation Service 109 for relaying a license 127, a State Tracking Service 111 for relaying state information 115, and a Trust Authority Service 113 for relaying keys and/or certificates 117. The services 105-111, advantageously, can be configured as a middle-tier or layer that can be plugged-in between the Trust Authority Service 113, and the Web Services Provider 101 and the Web Services Client 103. Advantageously, existing Web services systems can be modified to practice the exemplary embodiments based on such middle layer configuration.

A rights language, such as eXtensible Rights Markup Language (XrML), eXtensible Access Control Markup Language (XACML), Open Digital Rights Language (ODRL), and the like, can be used to specify a rights expression, rights expression information, and the like, for example, in the form of the license 127. However, the license 127 can be specified in any suitable manner. In addition, the license 127 can be based on a pre-defined specification, template, prototype, and the like, that can be associated with the Web service, according to further exemplary embodiments. Accordingly, the process of specifying the license 127 can include any suitable process for associating rights, conditions, and the like, with access to services, such as Web services.

An exemplary workflow for the Networked Services Licensing System 100 can include a user operating within the Web Services Client 103 environment being issued the license 127 by the License Issuing Service 105 for accessing a service of the Web Services Provider 101. When the user wishes to use a service 119 provided by the Web Services Provider 101, the user can make a request 121 for the service 119 from the Web Services Provider 101 along with the issued license 127. When associated conditions (for example, obligations 123), such as the collection of a fee, the authentication of the user, and the like, are satisfied based on a license interpretation request 125, as verified, for example, by the License Interpretation Service 109, and the State Tracking Service 111, the user can be allowed access to the service 119 of the Web Services Provider 101 in accordance with a manner of use specified in the license 127.

Advantageously, the license 127 can specify any suitable usage rights associated with the service 119. The interpretation and enforcement of the usage rights are further described in commonly assigned U.S. Pat. Nos. 5,530,235, 5,629,980, 5,634,012, 5,638,443, 5,715,403, 6,233,684, and 6,236,971, for example. The steps above can take place sequentially or approximately simultaneously or in various orders.

FIG. 1 illustrates exemplary participants in a generalized Web service model, where the access to services and/or content is specified by a license expressed in a rights language, such as XrML, and the like. Advantageously, the use of a rights language to define access fits the Web services paradigm of distributed policies and access points because a rights language can capture both the rights and the context on which those rights can be exercised. The context can include information, an identification, and the like, of the client that is authorized to exercise the rights, the associated resources and conditions that have to be met in order to exercise the rights.

The top and bottom layers of FIG. 1 can be used to contrast a typical model for providing Web services, wherein the Web Services Provider 101 controls access through simple processes, such as user-name and password, and local policy evaluation. By contrast, according to the exemplary embodiments, the middle layer is involved in defining processes and/or determining authorization for access the service 119 provided by the Web Services Provider 101. This middle layer can be referred to as a "rights layer."

Advantageously, tasks related to determining authorization to the service 119, authentication, accounting, and the like, can be managed, outsourced, handled, and the like, by the specialized services provided by the middle layer. In this way, the Web Services Provider 101 can enjoy the luxury of focusing solely on the business logic of the service 119, while outsourcing other activities, such as the processing of payments, the maintaining of customer databases, and the like, that typically would be employed in a more monolithic e-commerce model. Accordingly, the Web Services Provider 101 processes the rights expression in the form of the license 127 that is presented by the Web Services Client 103 in order to determine what services to provide and how to provide such services. According to an exemplary embodiment, the license interpretation, the state information tracking, for example, such as how many times the service 119 has been rendered, which can be the accounting part, and the like, can be outsourced to third party providers.

The exemplary embodiments, thus, provide the authorizing of the access to the service 119, for example, via the generation of the license 127. By contrast, other Web services systems and methods typically control access by remembering a client's identity and by requesting a credential, such as user-name and password. In the exemplary embodiments, however, such credentials are augmented in the form of the license 127. The issuing of the license 127 can be accomplished by the rights layer, but can include processes performed by the Web Services Provider 101. The rights layer can include the Business Network(s) 107, such as a partner that bought the service 119 and is now allowing its customer base access to the service 119. Thus, anyone with a business arrangement with the Web Services Provider 101 can be capable of issuing the license 127, according to further exemplary embodiments.

The interaction of the Web Service Client 103 with the Web Services Provider 101 can involve various mechanisms and transactions, such as a request for service, a financial transaction, a rendering of the service 119, and the like. For example, of the Web Service Client 103 can contact the Web Services Provider 101 and request some type of service 119. The access to the service 119 also can include various transactions, such as access, rendering, execution of code, send-back of data, collecting payment, and the like. Accordingly, the access to the service 119 can include any suitable interactions and/or results between the Web Service Client 103 and the Web Services Provider 101.

The Networked Services Licensing System 100 is of an exemplary nature and can be implemented in numerous other arrangements. For example, a clearinghouse (not shown) can be used to process payment transactions and verify payment prior to the Issuing Service 105 issuing the license 127. Moreover, the various processes and transactions can be performed, for example, via online and/or offline environments and/or combinations thereof, according to further exemplary embodiments. Accordingly, the various devices and/or components of the Networked Services Licensing System 100 can, but need not, communicate directly with one another and information can be exchanged in any suitable manner, such as by physically moving media between the devices the various devices and/or components of the Networked Services Licensing System 100.

The devices and subsystems of the Networked Services Licensing System 100 of FIG. 1 can communicate, for example, over one or more communications networks (not shown), and can include, for example, any suitable servers, workstations, personal computers (PCs), laptop computers, PDAs, Internet appliances, set top boxes, modems, handheld devices, telephones, cellular telephones, wireless devices, other devices, and the like, capable of performing the processes of the exemplary embodiments. The devices and subsystems can communicate with each other using any suitable protocol and can be implemented using a general-purpose computer system, for example. One or more interface mechanisms can be used in the Networked Services Licensing System 100, for example, including Internet access, telecommunications in any suitable form, such as voice, modem, and the like, wireless communications media, and the like. Accordingly, such communications network(s) can include, for example, wireless communications networks, cellular communications networks, satellite communications networks, Public Switched Telephone Networks (PSTNs), Packet Data Networks (PDNs), the Internet, intranets, and the like. In addition, such communications network(s) can be the same or different networks.

As noted above, it is to be understood that the Networked Services Licensing System 100 of FIG. 1 is for exemplary purposes, as many variations of the specific hardware used to implement the exemplary embodiments are possible. For example, the functionality of the devices and the subsystems of the Networked Services Licensing System 100 can be implemented via one or more programmed computer systems or devices. To implement such variations as well as other variations, a single computer system can be programmed to perform the special purpose functions of one or more of the devices and subsystems of the Networked Services Licensing System 100. On the other hand, two or more programmed computer systems or devices can be substituted for any one of the devices and subsystems of the Networked Services Licensing System 100. Accordingly, principles and advantages of distributed processing, such as redundancy, replication, and the like, also can be implemented, as desired, to increase the robustness and performance of the Networked Services Licensing System 100, for example.

The components of the Networked Services Licensing System 100, for example, including the license 127, the Web Services Provider 101, the Web Services Client 103, the License Generation and/or Issuing Service 105, the License Validation and/or Interpretation Service 109, the State Tracking Service 111, and the Trust Authority Service 113, according to various embodiments, will now be further described.

The license 127, for example, can be based on rights language-based functions, such as XrML functions, and the like, in the exemplary embodiments. The Web Services Client 103 can present the license 127 to the Web Services Provider 101, when the Web Services Client 103 requests the service 119. The license 127, for example, can convey the rights and conditions governing the rendering of services, such the service 119, the manner of use of the services, and the like. In addition, the license 127, for example, can convey the context in which transactions between the Services Client 103 and the Web Services Provider 101 can take place, and the like.

Accordingly, the license 127 can convey information, for example, including the service 119, parts of the service 119, a principal to whom the license 127 has been granted, the rights that are granted, the conditions under which the service 119 can be accessed, obligations that the Web Services Provider 101 and/or the Web Services Client 103 may have to perform while allowing access to a protected resource of the service 119, trust domains, for example, including the issuer of the license 127 and/or the authority under which the license 127 has been issued, information to leverage or utilize security mechanisms, such as signatures and/or encryption mechanisms, any other suitable information, which can be mandatory and/or optionally employed by the Networked Services Licensing System 100, and the like.

An exemplary license 127, for example, written in XrML, is shown below that conveys, for example, a right to access the service 119 offered by the Web Services Provider 101, "www.foo.com/quoteService," and that has been granted to a holder of a specific cryptographic key, such as the principal, and the like, by the issuer, represented by another key value.

```
<license>
  <grant>
    <keyholder>
    ...
    </keyhoder>
    <ws:execute />
    <serviceReference>
      <foo: location uri= www.foo.com/quoteService/>
    </serviceReference>
  </grant>
<issuer>
  <dsig:keyValue>
  ...
  </dsig:keyValue>
</license>
```

The identification of the service 119 can be encoded in the license 127. Such encoding can be used to indicate that the license 127 refers to the service 119 in question. Additionally, any suitable granular identification of the service 119 in question can be specified. For example, the license 127 can describe that the license 127 pertains to a portion of the service 119, a certain Application Programming Interfaces (APIs) exposed by the service 119, and the like. Alternatively, the license 127 also can identify the service 119 including a set of services. For example, the service 119 can be described as "any service that originates from www.foo.com." Further, the service 119 identified can include any suitable combination of the models described above.

The principal specified in the license 127 can be used to verify the identity of the requester of the service 119, for example, a user of the service 119, such as the Web Services Client 103. The principal, thus, can be used to authenticate the requester of the service 119. Typically, the requester may have to present some form of credential at the time of the request 121, and such credential can verified against the identity of, for example, the principal specified in the license 127. The credential presented can employ various mechanisms, such as digital certificates, including a key, a security token, and the like.

The principal also can be specified, identified, and the like, in various ways. For example, the principal can be a specific principal, such as the holder of a cryptographic key, and the like. The principal also can specified as "anyone," such as "anyone in the universe," and the like. The principal also can be specified as a member of a set of principals, such as "any client that is a member of company ABC," and the like. Thus, depending on how the principal is specified, one or more credentials may be employed to fully resolve, match, and the like, the identity of the principal. The process to match credentials can include, for example, any suitable technology, traditional, proprietary or new, that can be used to authenticate a principal specified in a license.

The rights specified in the license 127 can be the granted or allowed "operations," that is, the manner of use, that the recipient of the grant, such as a principal, and the like, can exercise on the service 119, such as a Web service, and the like. Such operations can take various forms, such as "accessing the information on a Web service," "executing the software residing in a Web service," "retrieving some data that has been generated by a Web service," and the like.

The license 127 can include one or more conditions associated with a right to access the service 119. The conditions that can be specified in the license 127 and that may have to be satisfied in order to exercise the manner of use. For example, the conditions can include temporal conditions, such as a validity period, quantity conditions, such as the number of times the service can be accessed, payment conditions, accounting conditions, such as having the transaction tracked and recorded, and the like. Thus, conditions can include any suitable restrictions, parameters, obligations, states, and the like, that may have to be to be met before, during, after, in order to exercise the right.

The trust domain that can be specified in the license 127 can relate to the identity of the issuer of the license 127. For example, when the Web Services Provider 101 accepts the license 127 from the Web Services Client 103, the Web Services Provider 101 may have to determine if the Web Services Provider 101 can trust the information included in the license 127. In an exemplary embodiment, the entity that issued the license 127 can be identified by the issuer of the license 127.

The license 127 can employ, for example, security technologies in order to safeguard the information included in the license 127. For example, the Web Services Provider 101 can employ mechanisms to determine if the issuer of the license can be trusted, to determine if the license has not been tampered with, and the like. Thus, digital signatures technologies, and the like, can be employed to ensure the integrity of the license 127, and encryption technologies, and the like, can be used to keep certain information in the license 127 confidential.

Figure 2:
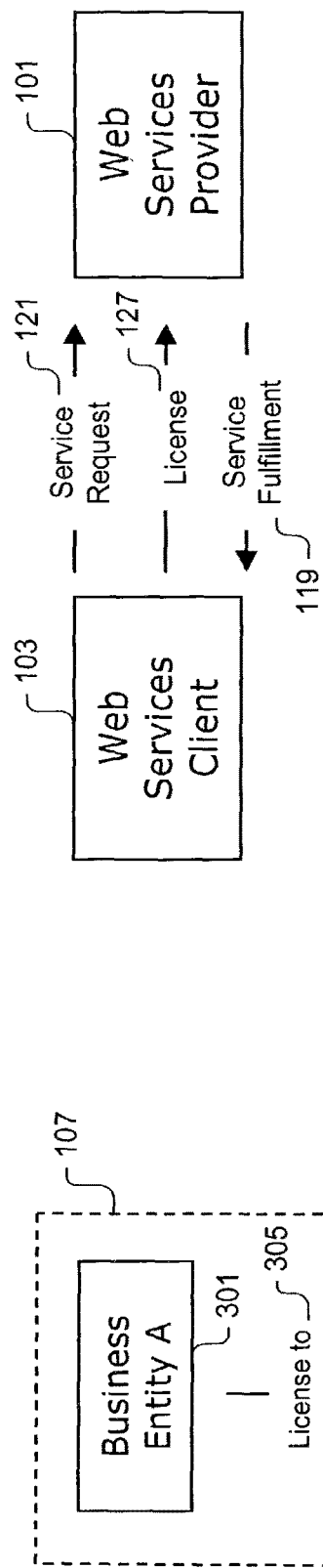
FIG. 2 is a schematic illustration of exemplary interactions between a Web Services Provider, and a Web Services Client of the Networked Services Licensing System of FIG. 1, according to an exemplary embodiment.

FIG. 2 is a schematic illustration of exemplary interactions between the Web Services Provider 101 and the Web Services Client 103 of the Networked Services Licensing System 100, according to an exemplary embodiment. As shown in FIG. 2, the license 127 can be conveyed, transmitted, and the like, by the Web Services Client 103 to the Web Services Provider 101 when making the request 121 for the service 119. The Web Services Provider 101 then can render the service 119 based on rights, conditions, and the like, specified in the license 127. For example, the Web Services Client 103 and the Web Services Provider 101 can arrange before-hand that the license 127 is to be transmitted in a data stream including the service request 121, based on a license protocol that includes the process of negotiating and/or submitting the license 127, and the like.

According to the exemplary embodiments, the Web Services Provider 101 typically focuses on providing the service 119. In addition, since authorization and/or commerce-related tasks can be managed elsewhere, as proposed in the exemplary embodiments, then tasks, such as the managing payments, the maintaining customers databases, and the like, can be eliminated. Advantageously, this allows the Web Services Provider 101 to more efficiently focus on providing the service 119.

The Web Services Provider 101 also can handle the service requests 121. Mechanisms to handle the service requests 121 can include, for example, proprietary mechanisms, standard mechanisms, such as Simple Object Access Protocol (SOAP), Web Service Description Language (WSDL), other messaging protocols, and the like. However, any suitable mechanisms that can handle and/or process a service request can be employed.

In addition, the Web Services Provider 101 can employ a license protocol. Such protocol can include, for example, any suitable open or proprietary licensing mechanisms, a prior agreement to embed the license 127 in the request 121, a protocol that determines the need for the license 127, sending the requester to a site to obtain the license 127, and the like.

The Web Services Provider 101, thus, consumes and/or accepts the license 127 that has been conveyed by the Web Services Client 103 for gaining access to the service 119. After determining that the license 127 can be trusted, the Web Services Provider 101 can render the service 119, for example, based on rights and/or conditions specified in the license 127. If the license 127 is deemed invalid or untrustworthy, the Web Services Provider 101, for example, may not provide and/or render the service 119, and can generate an error message, for example, indicating that access to the service 119 is denied. Further, the Web Services Provider 101 may have to satisfy, as a condition of the license 127, obligations that result from the rendering the service 119, such as tracking of a state, and the like, and that can be specified in the license 127.

According to the exemplary embodiments, the Web Services Client 103 typically is the consumer device of the service 119, that is, the user device. The Web Services Client 103 can determine how to access the service 119, for example, via manual processes, through various technologies, such as Universal Description Discovery and Integration Standard (UDDI) registries, WSDL definitions, and the like. The Web Services Client 103 can present, convey, transmit, and the like, the license 127 to the Web Services Provider 101, for example, at the time of service request 121 or at a different time, in order to access the service 119.

In addition, the Web Services Client 103 can be aware that the license 127 can be employed in order to access the service 119. In other words, the Web Services Client 103 understands that access to the service 119 can entail the possession of the license 127, knows where to obtain the license 127, and the like. Such processes can be accomplished by a license protocol, wherein the request 121 for service 119 is followed by a response indicating that certain credentials, for example, such as the license 127, are employed for gaining access to the service 119. Such processing can be accomplished, for example, by manual processes, such as via agreements, for example, wherein the Web Services Provider 101 informs the Web Services Client 103 that a license is employed for accessing the service 119, and the like. Thus, Web Services Client 103 consumes the service 119, for example, executes code, renders content, and the like, after the Web Services Provider 101 has accepted the license 127.

In an exemplary embodiment, the Web Services Provider 101 also can be a Web Services Client, such as when the Web Services Provider 101 is a client of another Web service, and the like. Thus, the modes of operation of the exemplary embodiments are not so limited, but rather include other possible permutations of the exemplary. In a further exemplary embodiment, for example, the Web Services Client 103 might use a third party to present the license 127 and the presenter of the license 127 need not be the consumer of the service 119. In this exemplary embodiment, the Web Services Client 103 can provide, for example, additional information indicating that the license 127 can be presented by a third party.

The exemplary embodiments can include a lifecycle for rights, referred to as the "rights lifecycle." For example, the rights lifecycle can begin with the creation of the license 127, which can be used to associate some rights and/or conditions with some resource, such as the service 119. The license 127 then can be issued to the Web Services Client 103 who would then use the license 127 to obtain the service 119. Eventually, the license 127 is consumed by the Web Services Provider 101, for example, during the rendering of the service 119, completing the rights lifecycle.

In a typical DRM system, the issuing of a licenses typically is controlled by a single and/or centralized entity. Such entity typically is responsible for the computational tasks of issuing the license, which can include creating the license, validating the license, signing the license, and license recovery. Similarly, in a typical access control system, the authorization assertions are generated by a centralized entity, where security policies are defined and managed. By contrast, in an exemplary embodiment, the generation of the license 127 can be logically separated from the issuing of the license 127. Typically, the license 127 generation includes the computational functions to create the license 127, such as creating an XrML file, and the like, constructing the elements, storing the license in a database, and the like. The license issuing can be the actual authorization of the rights that are granted in the license 127, for example, including digitally signing the license 127 and/or attesting that the rights conveyed in the license 127 are authorized by the issuer, and the like.

According to the exemplary embodiments, the License Generation Service 105, a task, and the like, can provide additional services, such as data backup, license version control, upgrades, license revocation, and the like. Advantageously, such services can add further value, to the valued added by the process of generating the license 127.

The tasks of generating and issuing the license 127 can be performed by a single application, and/or system. However, the separation of authority between license 127 generation and the license 127 issuing, advantageously, supports various exemplary business embodiments. For example, this approach allows a business entity the option to outsource the data intensive part of generating the license 127, and to focus on the authority part of signing and issuing the license 127. This approach, advantageously, enables a single service that can generate and issue licenses 127 on behalf of different business entities, as will now be discussed.

Figure 3:
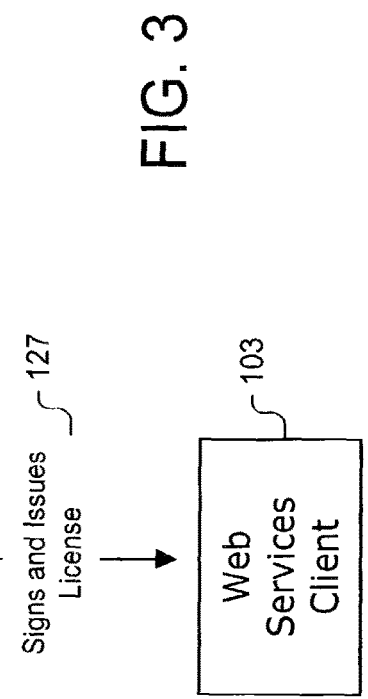
FIG. 3 is a schematic illustration of exemplary interactions between one or more Business Networks, and a License Issuing and/or Generation Service of the Networked Services Licensing System of FIG. 1, according to an exemplary embodiment.

FIG. 3 is a schematic illustration of exemplary interactions between one or more of the Business Networks 107 and the License Issuing and/or Generation Service 105 of the Networked Services Licensing System 100, according to an exemplary embodiment. In FIG. 3, the authority to issue licenses 127 can be conveyed in the form of the license 305 to issue licenses 127, referred to as a "distribution" license, and as shown in FIG. 3. Accordingly, the distribution license 305 grants the right to issue one or more of the licenses 127. The distribution license 305 also can specify a manner of use that can be granted and conditions, such as the maximum number of licenses 127 that the License Generation Service 105 can issue, and the like. The distribution license 305 also can be used to attest that the issuer of the license 127 has the authority to issue the licenses 127, and can be referenced when the issuer's signature is not recognized, but the signature of the issuer of the distribution license 305 is recognized.

In other words, the presence of distribution licenses 305 establishes a trust model, wherein signatures in the licenses 127 can be checked, for example, during license 127 interpretation, up the chain of distribution until a signature, signatures, and the like, are recognized, trusted, and the like. Such a model fits well in the exemplary embodiments, where an owner of a service can grant the right, in the form of a license, to issue licenses to business partners, for example, after some contract or business arrangements.

For example, an exemplary workflow for license generation and issuing, can include business partner 301 (Business Entity A), and business partner 303 (Business entity B). In this example, the Business Entity A owns and operates a Web service, and Business Entity B wishes to bundle the Web service as part of a product line of Business Entity B. Accordingly, the Business Entity A issues the distribution license 305 to the Business Entity B granting the Business Entity B the right to issue the licenses 127 to the customers, for example, the Web Services Client 103, of the Business Entity B, for example, to access the Web service provided by the Business Entity A. The Business Entity B issues the licenses 127 to the customers, for example, by utilizing the License Issuing Service 105 to generate the license 127. When the Web Services Client 103 accesses the Web service provided by the Business Entity A, the license 127 is presented and the Web service can check the authority of the license 127 by recognizing that the Business Entity B was granted the right to issue such licenses 127.

Accordingly, the License Generation Service 105, for example, can perform the computational process of generating an unsigned license 309, the distribution license 305, and/or the license 127 based on a request 307, and including schema validation, and the like. In addition, the License Generation Service 105 can provide a generalized interface to handle the service requests 307, for example, requests for licenses 127, 305 and/or 309. The License Generation Service 105 typically does not sign the license 127, but, according to a further exemplary embodiment, the License Generation Service 105 can sign the licenses 127 on behalf of a license 127 issuer, such as the Business Entity B. Further, the License Generation Service 105 can provide, for example, data management functions, such as the back-up issued licenses, the re-issue of licenses, reporting functions, and the like.

Figure 4:
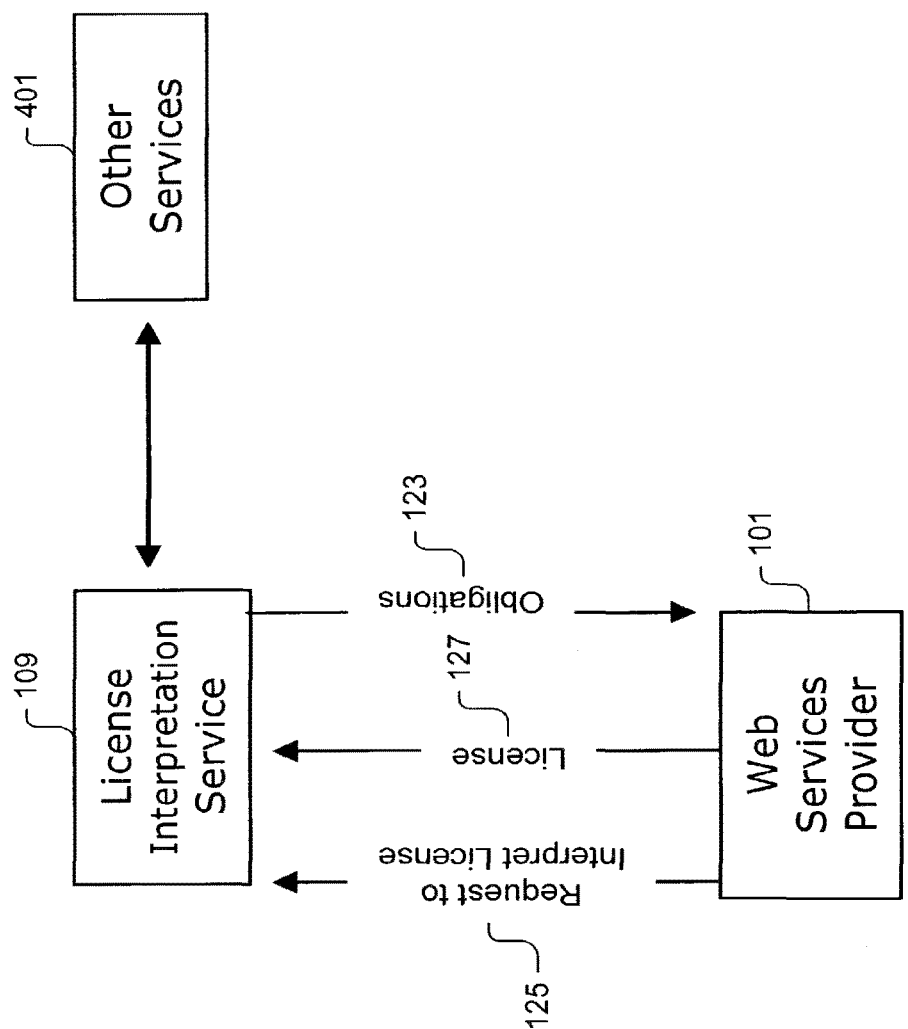
FIG. 4 is a schematic illustration of exemplary interactions between a Web Service Provider, and a License Interpretation Service of the Networked Services Licensing System, according to an exemplary embodiment.

FIG. 4 is a schematic illustration of exemplary interactions between the Web Service Provider 101 and the License Interpretation Service 109 of the Networked Services Licensing System 100, according to an exemplary embodiment. For example, in order to consume the service 119, such as allowing execution of code of the Web Services Provider 101, rendering encrypted and/or protected content of the Web Services Provider 101, and the like, the license 127 can be validated, and then interpreted based on the interpretation request 125 to determine if rights, conditions, such as obligations 123, specified therein allow such operation. The capabilities for validating and/or interpreting the license 127 can be built into the Web Services Provider 101 and/or a rendering application. However, according to further exemplary embodiments, such capabilities can be separated from the Web Services Provider 101 and/or the rendering application, and can be provided by a service, such as the License Interpretation Service 109.

Thus, according to an exemplary embodiment, the license 127 is validated and then interpreted by the License Interpretation Service 109. However, according to a further exemplary embodiment, this process can be performed in reverse order, and in which case the interpretation can be performed subject to a later validation step.

The License Interpretation Service 109 can be employed for the task of interpreting licenses 127, which is a counterpart of the license generation model of the License Interpretation Service 105, whereby the Web Services Provider 101 can offload computational tasks not directly associated with providing the service 119. The Web Services Provider 101 operating as such can offload the task of interpreting the license 127 to the License Interpretation Service 105, and, advantageously, focus in building the service 119. During license 127 interpretation, potentially other services 401 can be employed, as shown in FIG. 4. For example, the service 401 can be contacted to authenticate the principal, to retrieve information stored in a remote service, such as a trusted time clock, and the like.

Figure 5:
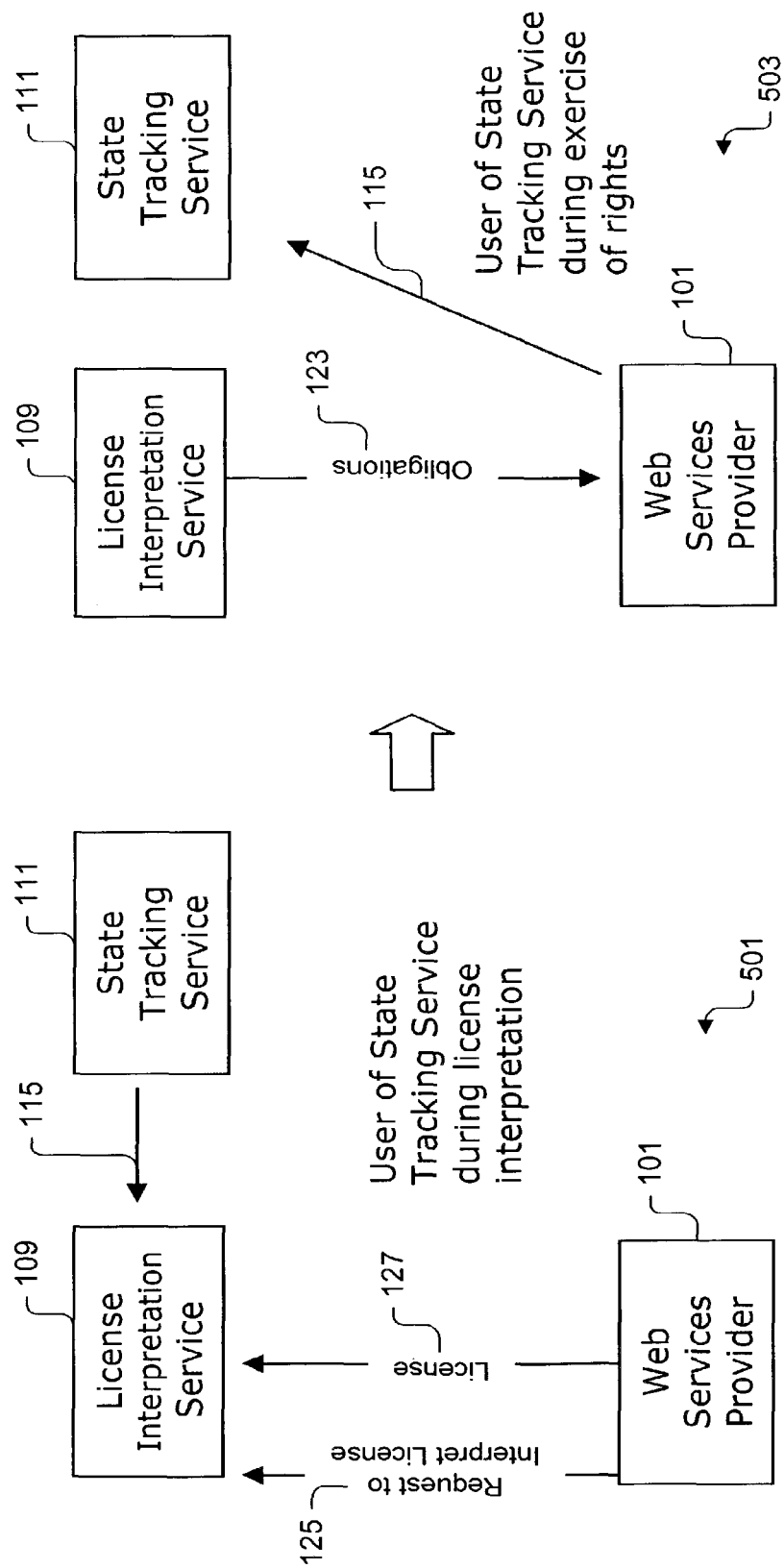
FIG. 5 is a schematic illustration of exemplary interactions between a Web Service Provider, a License Interpretation Service, and a State Tracking Service of the Networked Services Licensing System, according to an exemplary embodiment.

FIG. 5 is a schematic illustration of exemplary interactions between the Web Service Provider 101, the License Interpretation Service 109, and the State Tracking Service 111 of the Networked Services Licensing System 100, according to an exemplary embodiment. In FIG. 5, the use of the State Tracking Service 111, during the license 127 interpretation stage 501, and during the exercise of rights stage 503, is shown.

The interpretation of the license 127 and/or the exercise of a right, can involve information that is stored outside of the license 127. For example, a condition of the license 127 can be that there is a limit to the number of times a resource provided by the Web Services Provider 101 can be accessed. Accordingly, during the interpretation of the license 127, including of such condition, the information regarding the number of times the resource has already been accessed may have to be retrieved in order to accurately and truthfully interpret whether a further access right can be granted.

Such information can be referred to as the state information 115, and the tracking of the state information 115 can be referred to as "state tracking" The state information 115 can include various types of information, such as information regarding the status of the license 127, the amount of time a resource has been used, information regarding payment for the service 119, information regarding the time of the day the service 119, the license 127, and/or the conditions, were issued, accessed, consumed, presented, and the like. Accordingly, the state information 115 can include any suitable information regarding the Networked Services Licensing System 100, and the like.

The state information 115 can reside and/or be recorded in persistent storage, such as a database, a memory, a service, and the like, of the Networked Services Licensing System 100. For example, the state information 115, such as the number of times the service 119 has been accessed by the Web Services Client 103, and the like, can be recorded in some persistent storage of the Networked Services Licensing System 100. Additionally, as previously described, the interpretation of the license 127 can result in the obligations 123 that may have to be fulfilled while allowing the exercise of the rights.

Although the tracking of the state information 115 can be implemented locally, for example, by the Web Services Provider 101, this can create an additional burden for the Web Services Provider 101. In addition, local tracking by the Web Services Provider 101 may be difficult to implement, because the Web Services Provider 101 may not be able to accommodate the local storage of the state information 115. Advantageously, the State Tracking Service 111 addresses the noted and other problems associated with the tracking of state information by the Web Services Provider 101. A rights language, as previously described, can be used to specify, for example, where the Tracking Service 111 is referenced, where the state information 115 related to the conditions of the rights can be managed, and the like. Thus, the State Tracking Service 111 can be used for tracking, providing, and the like, the state information 115 that can be specified in the license 127.

The Trust Authority Service 113 can include elements and/or services that, for example, establish, manage, and the like, trust relations for the various entities of the exemplary embodiments. For example, the Trust Authority Service 113 can include a Certificate Authority (CA) function for issuing the digital certificates, digital credentials and/or encryption keys 117 that can be employed to sign the licenses 127. Accordingly, the Trust Authority Service 113, for example, can include a corporation's Public Key Infrastructure (PKI), a service provided by a PKI and/or security provider, a separate service employed to establish a trust relation between business partners, and the like.

Therefore, according to an exemplary embodiment, the Trust Authority Service 113 can include the function issuing of digital credentials 117, for example, used to identify the principals. Exemplary digital credentials 117 can include, for example, an X509 digital certificate, a Microsoft Passport, a Kerberos authentication token, and the like. The credentials 117 of the type described above can be used to specify and/or certify the identity of the holder, but typically convey little additional information about the holder, as most of such additional information typically is provided in a fixed format and/or is implied. For example, a passport holder typically is simply someone that has been authenticated with the Microsoft passport service.

Accordingly, a need exists to attach additional information about identities, for example, of the principals, in a more expressive and/or robust manner, for example, to express the role of the principal, a membership association for the principal, and the like. A rights language, as previously described, and according to a further exemplary embodiment, advantageously, can be used define a certificate 117 that can be used to convey credentials in a more expressive manner, for example, to express the role of the principal, a membership association for a principal, and the like. The credentials 117 then can be used to associate the holder with additional properties, such as a membership in a business circle, a relationship in a business environment, and the like.

Typically, a Certificate Authority can attest to the authenticity of the information included in a digital certificate. If the information in the digital certificate can be limited in scope, for example, such as a company name, the functions of the Certificate Authority can be well defined. For example, a Certificate Authority may have an established process to check a company's name before issuing a digital certificate. However, when the credentials become more expressive, as described above, it becomes more difficult for a Certificate Authority to attest to the authenticity of the credential information. For example, if a credential includes some membership information, the Certificate Authority would have to establish some additional process to validate such membership.

Accordingly, a generic Certificate Authority typically cannot verify such additional information. Typically, the Certificate Authority, a signer, and the like, of the credential can become the system where the credential is to be used. In this exemplary embodiment, the trust model becomes less open and more monolithic, for example, since the system typically can trust the system. To use credentials with more expressive information in a more open system, for example, within a business network of affiliated services, the Trust Authority Service 113, advantageously, can be employed to attest to additional information that can be included in the certificates 117. According to an exemplary embodiment, a Certificate Authority can be configured to fulfill the above-note needs. However, a "trust broker," such as the Trust Authority Service 113 of the exemplary embodiments, advantageously, can be employed to address the noted and other problems with a Certificate Authority being employed to verify the above-noted additional information.

Just like the certificates 117, the licenses can be signed and/or verified, for example, through cryptographic techniques. The verification of the license 127 signature can be used, for example, to attest to the integrity of the license 127, the authenticity of the signer, such as the license 127 issuer, and the like. Typically, however, such verification does not establish a "rights trust," for example, to trust that the license 127 was issued with proper authorization, unless the verifier authorized the issuing of the license 127. This is a difference between the license 127 validation, and the license 127 interpretation, as previously discussed.

For example, Company B issues a license B' to Company A granting Company A the right to issue licenses A' on behalf of Company B. Then, Company A issues a license A' to user X, and user X presents the license A' to Company B to access a protected resource of Company B. In this exemplary embodiment, since company B issued the license B', the trust of license A' can be traced back to license B', which is trusted by default by company B.

Now, consider the case where Company C also accepts licenses A' for access to a protected resource of Company C. In order to trust the license A', Company C may have to either decide to trust licenses from Company A or issue a license C' to Company A with the right to issue licenses A' on behalf of Company C. As the network becomes large, every license A' would have to be accompanied with each of the authorizing licenses B', C', and so on.

In the above case, processing of such licenses A' quickly can become cumbersome and/or impractical. According to an exemplary embodiment, however, a "trust broker," such as the Trust Authority Service 113 of the exemplary embodiments, advantageously, can as the "trust broker," for example, to broker deals between companies, issues licenses under its own signature, and the like. In this exemplary embodiment, during the license 127 interpretation process, the signature of the Trust Authority Service 113 can be trusted.

When the Web Services Client 103 initiates, requests, and the like, the service 119, the Web Services Client 103 can transmit the license 127, for example, as part of a messaging protocol. Advantageously, according to an exemplary embodiment, the information for transmitting the license 127 at the time of the service 119 initiation can be provided in advance, for example, by reading some documentation on a Web site, and the like.

When the Web Services Client 103 initiates, requests, and the like, the service 119, the Web Services Client 103 can transmit the license 127, for example, as part of a messaging protocol. Although, according to an exemplary embodiment, the information for transmitting the license 127 at the time of the service 119 initiation can be provided in advance, by reading some documentation on a Web site, and the like, there is a need for a protocol, where the need for the license 127 can be communicated through a messaging mechanism. Advantageously, according to a further exemplary embodiment, such a protocol is provided, as will be further described. Exemplary embodiments for the service 119 initiation, for example, involving the license 127, will now be described.

Figure 6:
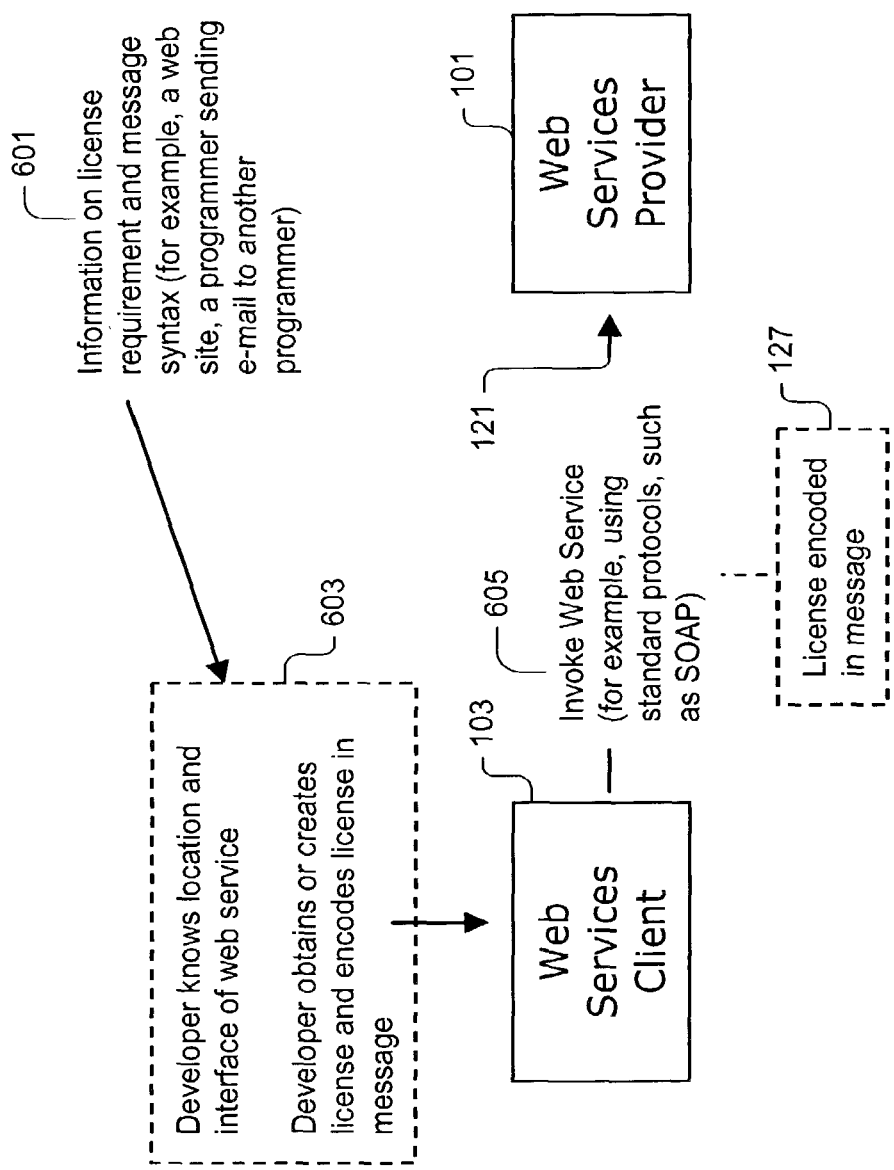
FIG. 6 illustrates an exemplary workflow for when a Web Services Client knows, in advance, that a license is to be included in a message for service initiation in the Networked Services Licensing System of FIG. 1, according to an exemplary embodiment.

FIG. 6 illustrates an exemplary workflow for when the Web Services Client 103 knows, for example, in advance, that the license 127 is to be included in the message 121 for the service 119 initiation in the Networked Services Licensing System 100 of FIG. 1. As shown in FIG. 6, at step 601, for example, such information can be obtained through various mechanisms, such as by obtaining information from a Web site, e-mail, facsimile, phone call, and the like. At step 603, for example, the license 127 can be encoded as part of the service 119 request message 121, which, at step 605, is transmitted to the Web Services Provider 101. According to an exemplary embodiment, the license 127 can be encoded in the message 121, manually, automatically, and the like, and employ a messaging protocol, for example, including a SOAP header, the messaging protocols of the further described exemplary embodiments, and the like.

Figure 7:
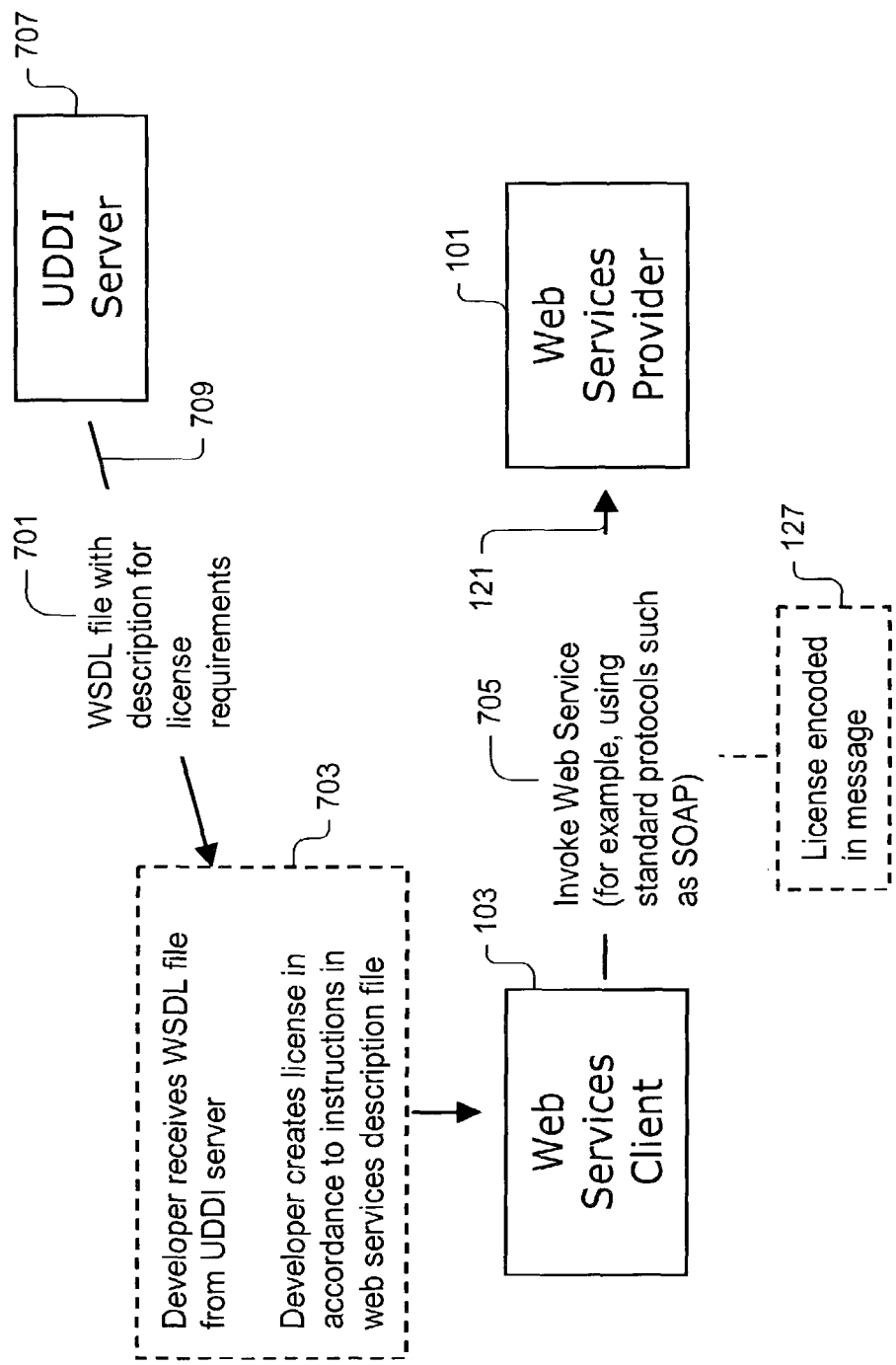
FIG. 7 illustrates an exemplary workflow for when a Web Services Client knows, via a service description language file, that a license is to be included in a message for a service initiation in the Networked Services Licensing System of FIG. 1, according to an exemplary embodiment.

FIG. 7 illustrates an exemplary workflow for when the Web Services Client 103 knows, for example, via a service description language file 709, such as a WSDL file stored in a UDDI-based service discovery server 707, and the like, that the license 127 is to be included in the message 121 for the service 119 initiation in the Networked Services Licensing System 100 of FIG. 1. As shown in FIG. 7, at step 701, for example, the WSDL file 709 is retrieved from the UDDI server 707, manually, automatically, and the like. At step 703, for example, the license can be encoded 127 as part of the service 119 request message 121, which, at step 705, is transmitted to the Web Services Provider 101. According to an exemplary embodiment, the license 127 can be encoded in the message 121, manually, automatically, and the like, and employ a messaging protocol, for example, including a SOAP header, the messaging protocols of the further described exemplary embodiments, and the like.

Figure 8:
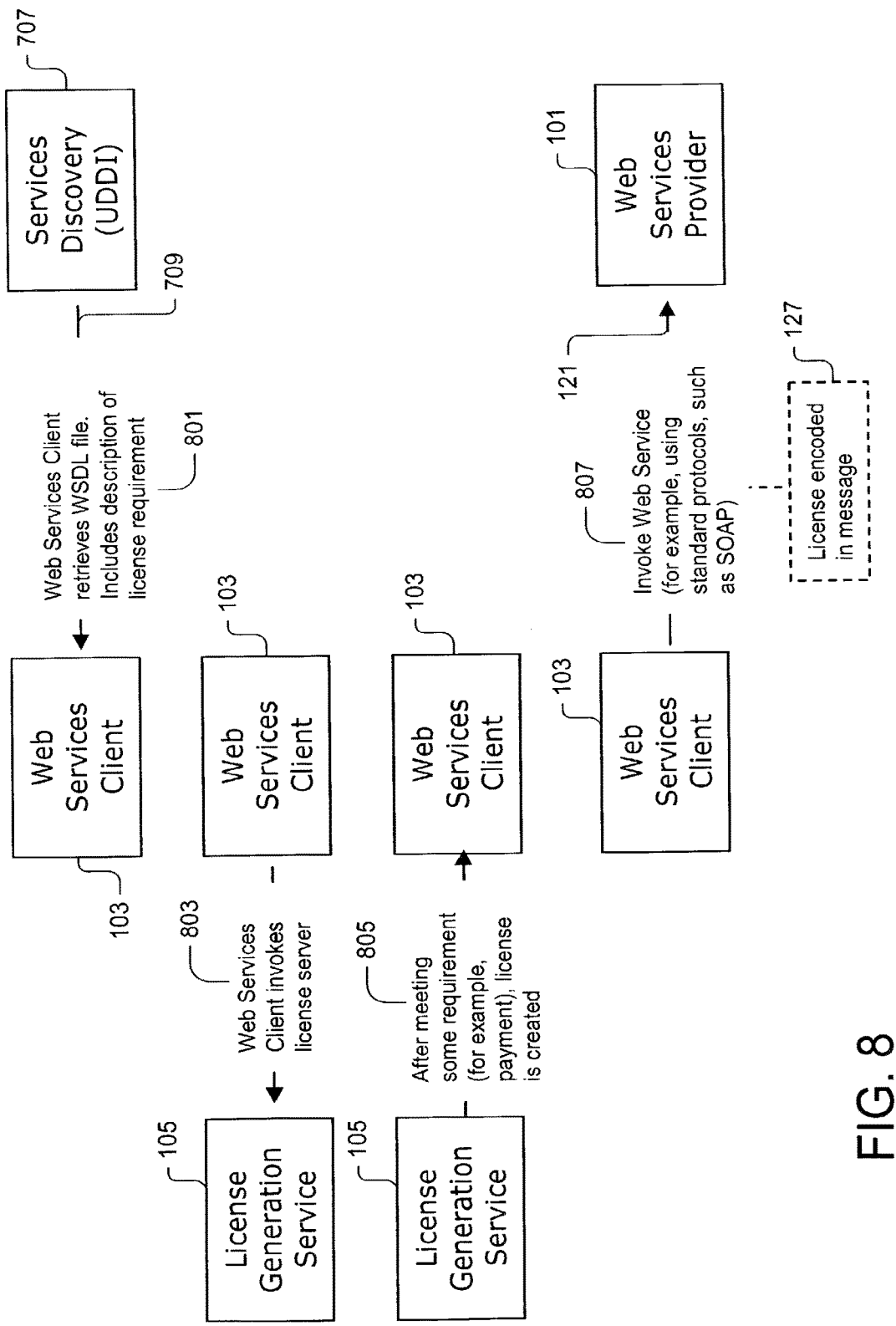
FIG. 8 illustrates an exemplary workflow for when a Web Services Client knows, via a service description language file, that a license is to be is to be obtained from a License Generation Service of the Networked Services Licensing System of FIG. 1, according to an exemplary embodiment.

FIG. 8 illustrates an exemplary workflow for when the Web Services Client 103 knows, for example, via a service description language file 709, such as a WSDL file stored in the UDDI-based service discovery server 707, and the like, that the license 127 can be obtained from the License Generation Service 105 of the Networked Services Licensing System 100 of FIG. 1. As shown in FIG. 8, at step 801, for example, a user at the Web Services Client 103 retrieves, manually, automatically, and the like, the WSDL file 709 from the UDDI server 707, wherein the service description in the WDSL file 709 includes a reference to a service, such as the License Generation Service 105, and the like, that can be used to issue the license 127 for the service 119. At step 803, the user at the Web Services Client 103, for example, initiates the License Generation Service 105.

At step 805, for example, after satisfying conditions, such as payment of a fee for the license 127, and the like, the Web Services Client 103 obtain the license 127, manually, automatically, and the like, from the License Generation Service 105. At step 807, the user at the Web Services Client 103, for example, encodes the license 127 as part of the service 119 request message 121, which then is transmitted to the Web Services Provider 101. According to an exemplary embodiment, the license 127 can be encoded in the message 121, manually, automatically, and the like, and employ a messaging protocol, for example, including a SOAP header, the messaging protocols of the further described exemplary embodiments, and the like.

Figure 9:
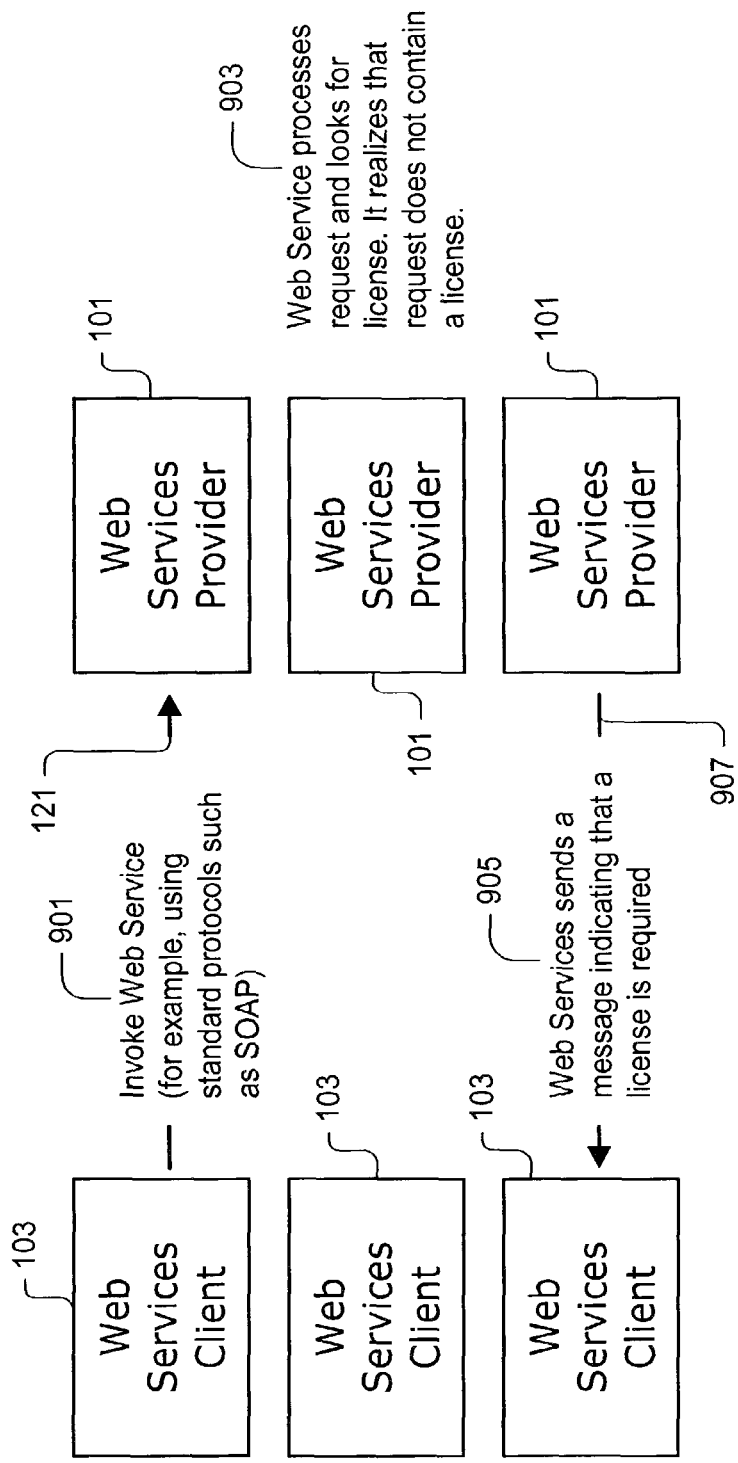
FIG. 9 illustrates an exemplary workflow for when a Web Services Client does not know that a license is to be employed for gaining access to a service in the Networked Services Licensing System of FIG. 1, according to an exemplary embodiment.

FIG. 9 illustrates an exemplary workflow for when the Web Services Client 103 does not know that the license 127 is to be employed for gaining access to the service 119 in the Networked Services Licensing System 100 of FIG. 1. As shown in FIG. 9, at step 901, for example, the Web Services Client 103 attempts to invoke and/or request the service 119 from the Web Services Provider 101, via the service 119 request message 121, which does not include the license 127. At step 903, the Web Services Provider 101 processes the service 119 request message 121, and determines that service 119 request message 121 does not include the license 127. At step 905, the Web Services Provider 101 transmits, for example, an error message 907, and the like, indicating that the license 127 is to be employed for gaining access to the service 119 of the Web Services Provider 101. At this point, the Web Services Client 103 can attempt to obtain the license 127, for example, employing the previously described methods of FIGS. 6-8, and as will be further described. According to an exemplary embodiment, the messages 907 and 121 can employ a messaging protocol, for example, including a SOAP header, the messaging protocols of the further described exemplary embodiments, and the like.

Figure 10:
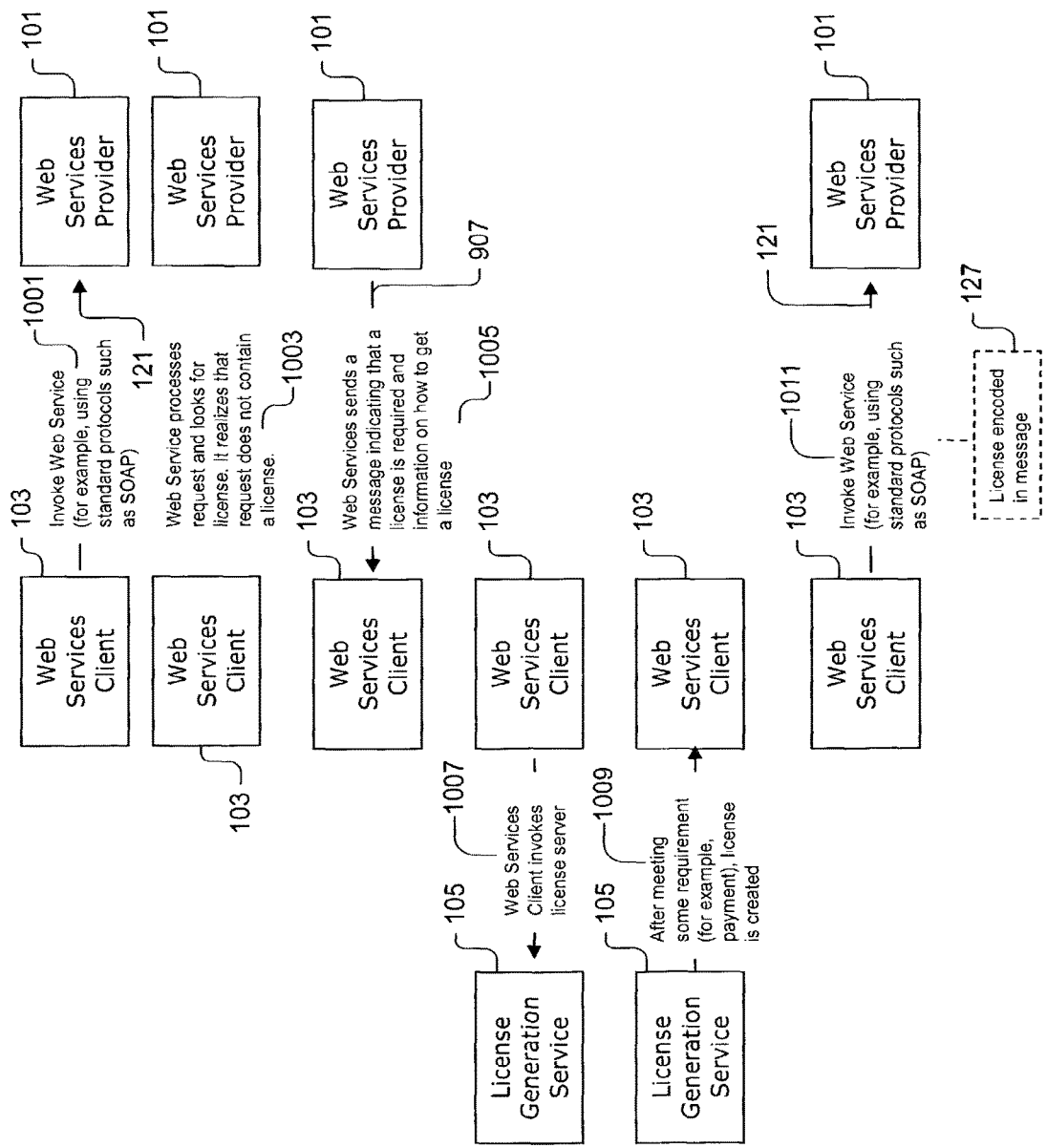
FIG. 10 illustrates an exemplary workflow for when a Web Services Client attempts to gain access to a service without a license, is informed that the license is to be employed, and obtains the license for gaining access to a service in the Networked Services Licensing System of FIG. 1, according to an exemplary embodiment.

FIG. 10 illustrates an exemplary workflow for when the Web Services Client 103 attempts to gain access to the service 119 without the license 127, is informed that the license 127 is to be employed, as shown in FIG. 9, and obtains the license 127 for gaining access to the service 119, using the method described in FIG. 8, in the Networked Services Licensing System 100 of FIG. 1. However, any suitable method for obtaining a license, such as the methods of FIGS. 6-8, and the like, can be employed to obtain the license 127.

Accordingly, as shown in FIG. 10, at step 1001, for example, the Web Services Client 103 attempts to invoke and/or request the service 119 from the Web Services Provider 101, via the service 119 request message 121, which does not include the license 127. At step 1003, the Web Services Provider 101 processes the service 119 request message 121, and determines that service 119 request message 121 does not include the license 127. At step 1005, the Web Services Provider 101 transmits, for example, the error message 907, and the like, indicating that the license 127 is to be employed for gaining access to the service 119 of the Web Services Provider 101.

The Web Services Client 103, then, determines that the License Generation Service 105, and the like, that can be used to issue the license 127 for the service 119. At step 1007, a user at the Web Services Client 103, for example, initiates the License Generation Service 105. At step 1009, for example, after satisfying conditions, such as payment of a fee for the license 127, and the like, the Web Services Client 103 obtain the license 127, manually, automatically, and the like, from the License Generation Service 105. At step 1011, the user at the Web Services Client 103, for example, encodes the license 127 as part of the service 119 request message 121, which then is transmitted to the Web Services Provider 101. According to an exemplary embodiment, the license 127 can be encoded in the message 121, manually, automatically, and the like, and employ a messaging protocol, for example, including a SOAP header, the messaging protocols of the further described exemplary embodiments, and the like.

According to the exemplary embodiments, a separation of authority between the generation of the license 127 and the issuing of the license 127 can be provided. For example, the issuing of the license 127 can signify that the issuer of the license 127 authorizes the rights in the license 127. Advantageously, such separation of authority provides for various exemplary embodiments, for example, as illustrated by the following exemplary workflows.

Figure 11:
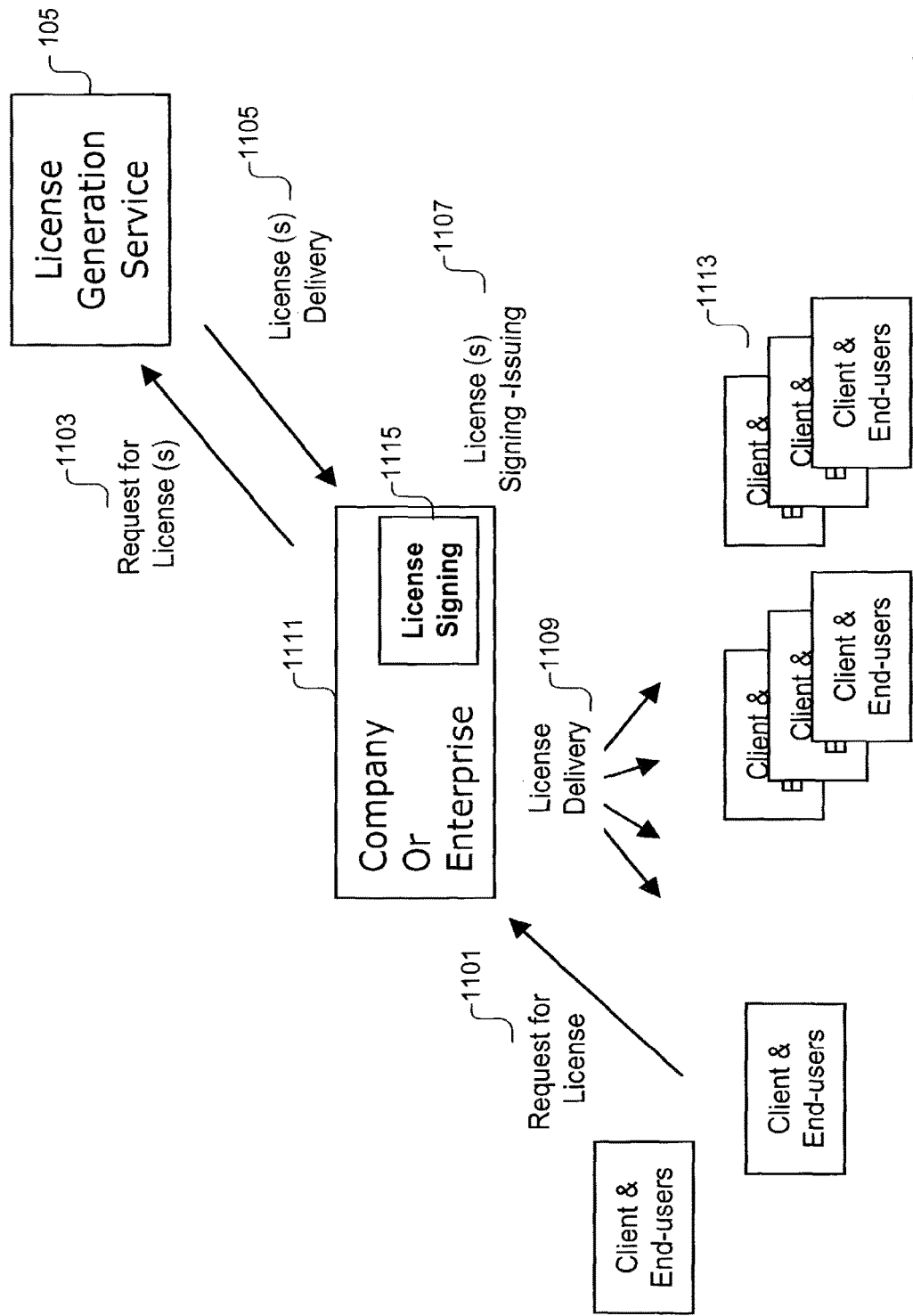
FIG. 11 illustrates an exemplary workflow for when an Enterprise out-sources license generation for gaining access to a service in the Networked Services Licensing System of FIG. 1, according to an exemplary embodiment.

FIG. 11 illustrates an exemplary workflow for when an Enterprise 1111 out-sources the license 127 generation for gaining access to a service in the Networked Services Licensing System 100 of FIG. 1. The exemplary workflow of FIG. 11 can be used, for example, in combination with the exemplary embodiments described herein. In FIG. 11, the Enterprise 1111, such as the Business Entity B 303, and the like, can out-source the license 127 generation to a service, such as the License Generation Service 105, and the like, according to an exemplary embodiment. Advantageously, in this manner, resources related to the task of the license 127 generation can be freed up for the Enterprise 1111.

Services of the Enterprise 1111 for which authorization to allow access is desired, and for which the licenses 127 can be generated, can include, for example, services owned by the Enterprise 1111, services owned by business partners of the Enterprise 1111, the service 119 provided by the Web Services Provider 101, and the like. The task of authorizing grants in the license 127, for example, the license 127 issuing, can include digitally signing the license 127, via license signing mechanism 1115, and the like, and can remain with the Enterprise 1111. In this exemplary embodiment, the Enterprise 1111 would have authorization to issue the licenses 127, for example, implicitly, as when the Enterprise 1111 owns the service in question, explicitly, as through the distribution license 305 granting the Enterprise the right to issue the licenses 127 on behalf of another business entity, and the like.

Accordingly, at step 1101, for example, one or more clients and/or end users 1113, such the Web Services Client 103, and the like, can request the licenses 127 from the Enterprise 1111. If the Enterprise 1111 decides to issue the requested licenses 127 to the clients and/or end users 1113, at step 1103, for example, the Enterprise 1111 requests unsigned licenses from the License Generation Service 105. In a further exemplary embodiment, the Enterprise 1111 can make such request for the unsigned licenses, for example, because the Enterprise 1111 may wish to "push" the licenses 127 onto the clients, such as for advertising purposes, promotional purposes, and the like. The Enterprise 1111 can communicate with the License Generation Service 105, and make the request for the unsigned licenses, using any suitable messaging protocol, such as the license protocol of the exemplary embodiments described herein.

At step 1105, for example, the License Generation Service 105 processes the request for the unsigned licenses, creates the unsigned licenses using any suitable license generation technique, such as the license generation techniques of the exemplary embodiments described herein, and delivers the unsigned licenses to the Enterprise 1111. At step 1107, for example, the Enterprise 1111 signs the license, and, at step 1109, delivers, transmits, conveys, issues, and the like, the signed licenses 127 to the clients and/or end users 1113.

The exemplary workflow, wherein the Enterprise 1111 out-sources the license generation and signing, is similar to that of FIG. 11, except that the License Generation Service 105 also can perform the signing of the unsigned licenses to generate the licenses 127. In this exemplary embodiment, the License Generation Service 105 can be configured, for example, as a "proxy" signer, and the like, for the Enterprise 1111. The License Generation Service 105, for example, can safeguard a signing key used to sign the unsigned licenses on behalf of the Enterprise 1111. Accordingly, although the issuing party is the Enterprise 1111, the License Generation Service 105 can act as a proxy for the Enterprise 111. Since the License Generation Service 105 maintains, safeguards, and the like, the signing keys, a requester of the license 127, advantageously, can be authenticated to prevent spoofing of the service, and the like.

Figure 12:
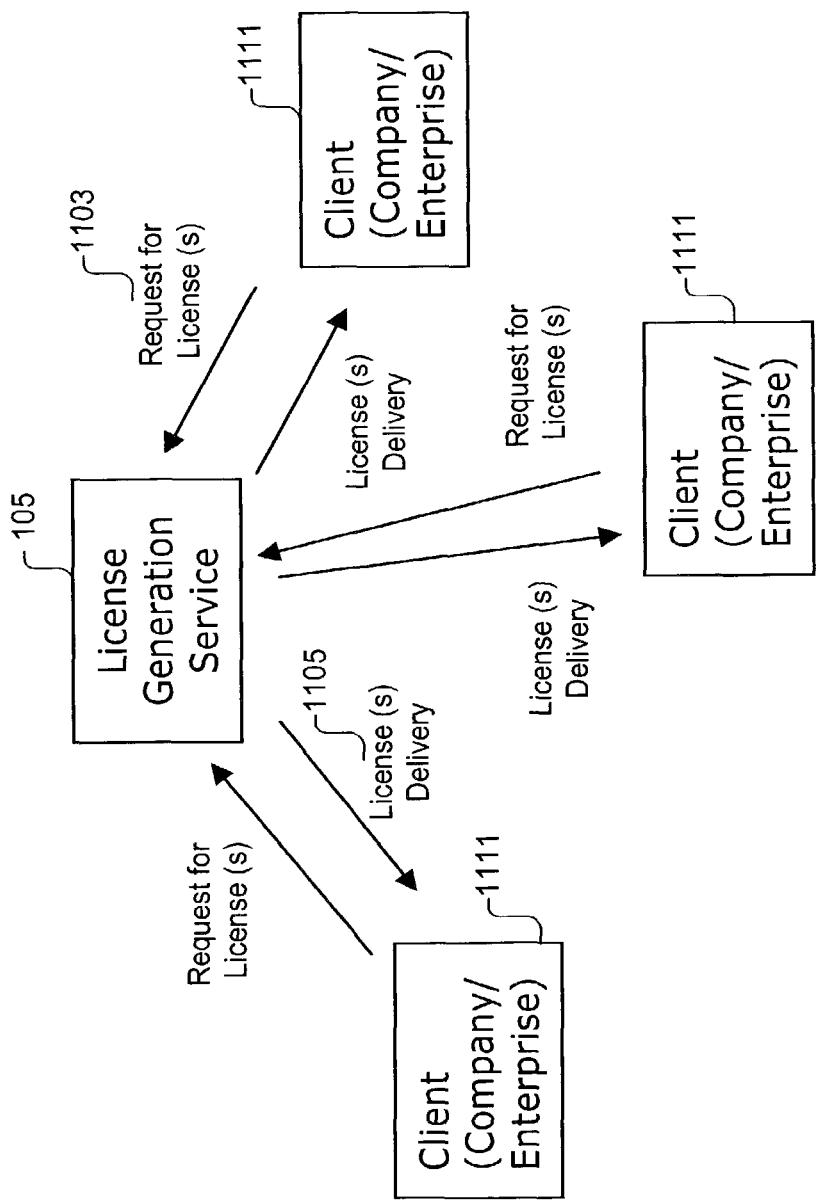
FIG. 12 illustrates an exemplary workflow for when a plurality of Enterprises out-source license generation for gaining access to a service in the Networked Services Licensing System of FIG. 1, according to an exemplary embodiment.

FIG. 12 illustrates an exemplary workflow for when a plurality of Enterprises 1111 out-source the license 127 generation for gaining access to a service in the Networked Services Licensing System 100 of FIG. 1. The exemplary workflow of FIG. 12 can be used, for example, in combination with the exemplary embodiments described herein. As shown in FIG. 12, from the perspective of the License Generation Service 105, advantageously, the License Generation Service 105 can provide the license request, at step 1103, license delivery, at step 1105, and the like, services to the plurality of Enterprises 1111. In this exemplary embodiment, each of the Enterprises 1111, for example, can be associated with a corresponding account, and the License Generation Service 105 can be configured to manage the licenses 127 issued on behalf of the plurality of Enterprises 1111, for example, on a per-account basis, and the like.

The License Generation Service 105 can utilize any suitable method for generating the licenses of the exemplary embodiments, for example, including the following exemplary methods, as will be described. The exemplary methods, advantageously, can be used to generate various types of licenses, such as the licenses 127, the distribution license 305, and the like.

Figure 13:
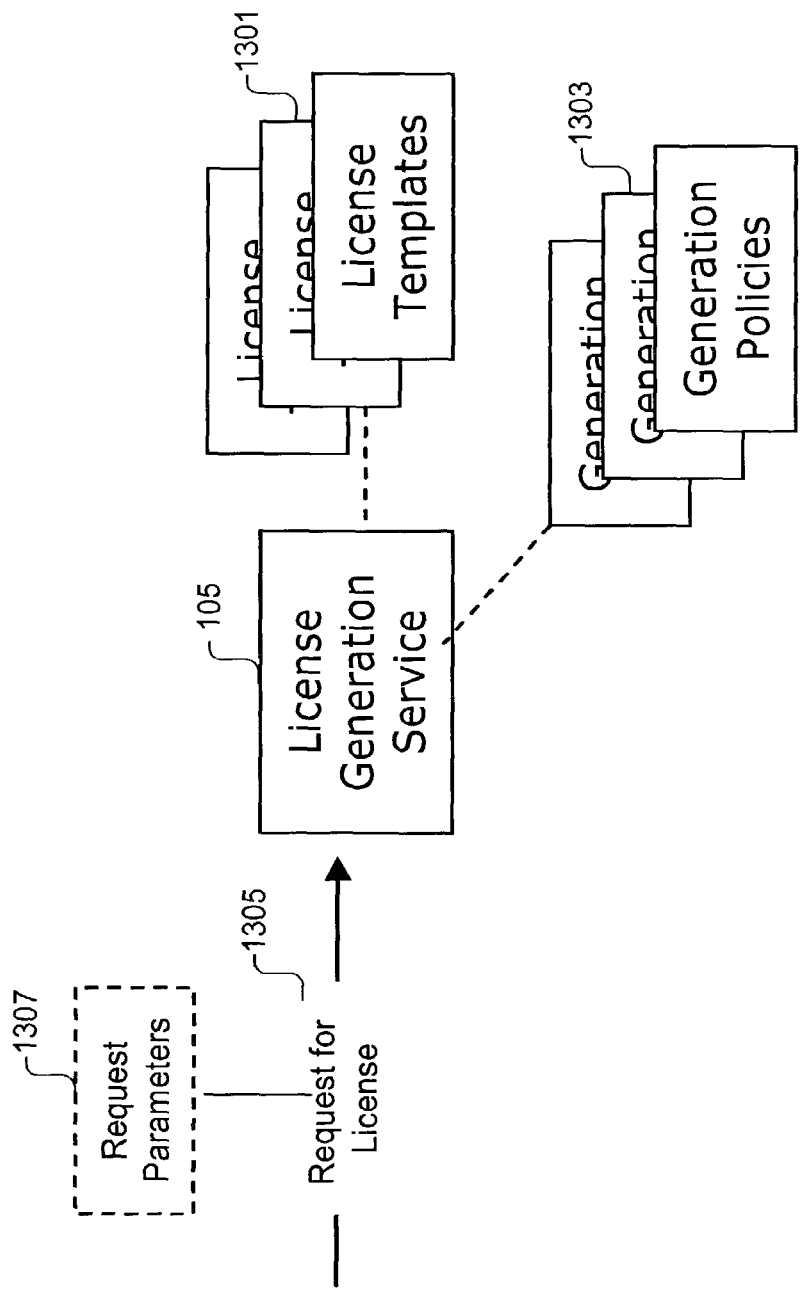
FIG. 13 illustrates an exemplary method for license generation, based on license templates, that can be used in the Networked Services Licensing System of FIG. 1, according to an exemplary embodiment.

FIG. 13 illustrates an exemplary method for license generation, based on license templates 1301, that can be used in the Networked Services Licensing System 100 of FIG. 1. As shown in FIG. 13, in this exemplary method, the License Generation Service 105, for example, manages local license templates 1301, and license generation policies 1303, under which the templates 1301 are used to generate a license, and the like. The templates 1301 and the policies 1303 can be created under the agreement of the authorizing entity, for example, an entity that can utilize the License Generation Service 105 in an out-source type of arrangement, and the like.

The license templates 1301, for example, can include predefined licenses, wherein one or more fields thereof are replaced, filled-in, and the like, when the license is generated. For example, the license templates 1301 can include a license template where the principal is not defined, and can replaced by a specific principal, where a resource, such as the service 119, is undefined, and replaced by a specific resource, and the like, at the time of license generation.

The license generation policies 1303, for example, can include rules for determining which templates to use, based on the request, and the like. For example, a policy can include a rule, such as "every request for a license involving a specific resource shall use template 123," "every request from company ABC will use the template ID 456 and resolve/replace the principal with the principal transmitted in the request," and the like.

Accordingly, a license request message 1305 transmitted to the License Generation Service 105 can include parameters 1307, such as a principal identification/key, resource ID, template ID, and the like, to allow for the generation of a corresponding license based thereon. The specification for the parameters 1307, for example, can be arranged manually, automatically, before-hand, codified in a WSDL description of the service, predetermined, and the like.

Figure 14:
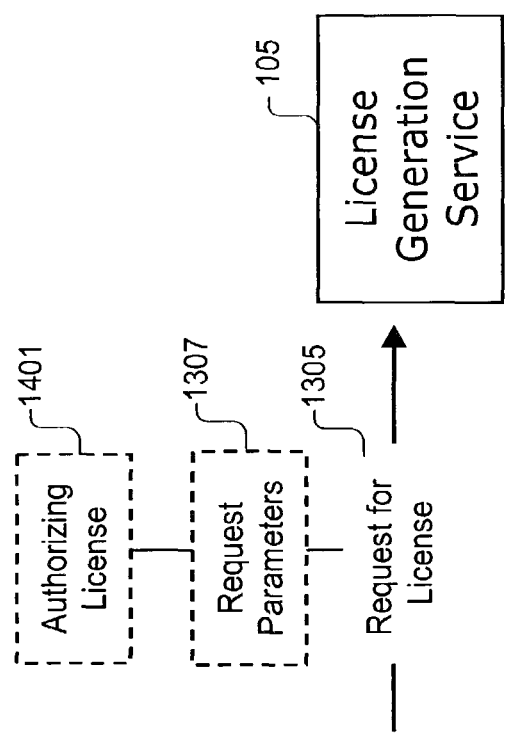
FIG. 14 illustrates an exemplary method for license generation, based on an authorizing license, that can be used in the Networked Services Licensing System of FIG. 1, according to an exemplary embodiment.

FIG. 14 illustrates an exemplary method for license generation, based on an authorizing license 1401, that can be used in the Networked Services Licensing System 100 of FIG. 1. In this exemplary method, the License Generation Service 105 receives along with the request 1305, the authorizing license 1401 that authorizes the issuing of a license, and which includes the grant or grants that are to be issued. Accordingly, the authorizing license 1401 can include, for example, a license prototype, recipe, and the like. In this manner, local templates typically do have to be employed, as the templates can be defined in the authorizing license 1401. This method can be employed, for example, using a rights language, such as XrML, and the like, that is capable of encoding the recipe to generate the grants within the authorizing license 1401.

Accordingly, the license request message 1305 transmitted to the License Generation Service 105 can include the parameters 1307, such as a principal identification/key, resource ID, and the like, to allow for the generation of a corresponding license based thereon. The specification for the parameters 1307, for example, can be arranged manually, automatically, before-hand, codified in a WSDL description of the service, predetermined, and the like.

The method of the exemplary embodiment can provides more flexibility than the exemplary method of FIG. 13. For example, by transmitting the instructions, recipe, license prototype, and the like, for creating a license, advantageously, the License Generation Service 105 can produce various types of licenses, not just licenses defined by the license templates 1301. In addition, the License Generation Service 105 can determine by, for example, evaluating and/or interpreting the authorizing license 1401 transmitted along with the request 1305, if issuance of a license has been authorized.

The license prototypes can include, for example, grants that are part of the authorizing licenses 1401 within the grant to issue licenses. Thus, the license prototypes can include, for example, grants from which final grants can be created. Such grants are related to the right to issue licenses included in the authorizing license 1401.

FIG. 15 illustrates an exemplary method for the license 127 generation, based on a license prototypes 1503, for example, within a context of rights language, such as the XrML language, and the like, and that can be in the Networked Services Licensing System 100 of FIG. 1. As shown in FIG. 15, an incoming request 1305 includes the authorizing license 1401, including the license prototype 1503 having zero or more variables "X." Then, at step 1501, for example, the License Generation Service 105 processes the request 1305 to generate the resultant license 127, by employing the license prototype 1503, and resolving the variables from license prototype 1503 with information 1507 from an issued license 1501.

FIG. 16 illustrates an exemplary method for license generation, from scratch, that can be used in the Networked Services Licensing System 100 of FIG. 1. In FIG. 16, another exemplary method of generating licenses, for example, includes generating licenses from "scratch." In this exemplary method, the License Generation Service 105 typically does not rely on the license templates 1301, and/or the authorizing licenses 1401. Instead, the License Generation Service 105 takes instructions received in the form of detailed parameters 1601 received along with the request 1305 to generate a license, and then generates custom license therefrom. With this exemplary method, the License Generation Service 105 can generate various types of licenses, rights expressions, and the like, based on appropriate detailed parameters 1601. However, the richness of the type of license than can be produced by this exemplary method, for example, can depend on the API employed for programming, and/or messaging, the capabilities of the underlying software, and the like. Accordingly, in this exemplary method, the employed programming and/or messaging interface can be configured so as to be sufficiently detailed to be able to transmit the information included in the detailed parameters 1601 needed to construct a full custom license. For example, such information can include information about the principal, information about the resource, information about the rights, information about conditions, and the like, that can be employed to construct a license.

Interpretation of a license, such as the license 127, the distribution license 305, and the like, for example, can include determining what right has been granted in the license, what conditions, if any, are associated with such grant, and the like. In an exemplary embodiment, the related process of validating the license can be bundled, associated, related, and the like, with the task of interpreting the license. However, according to a further exemplary embodiment, the license validation process can be separate from the process of license interpretation.

Figure 17:
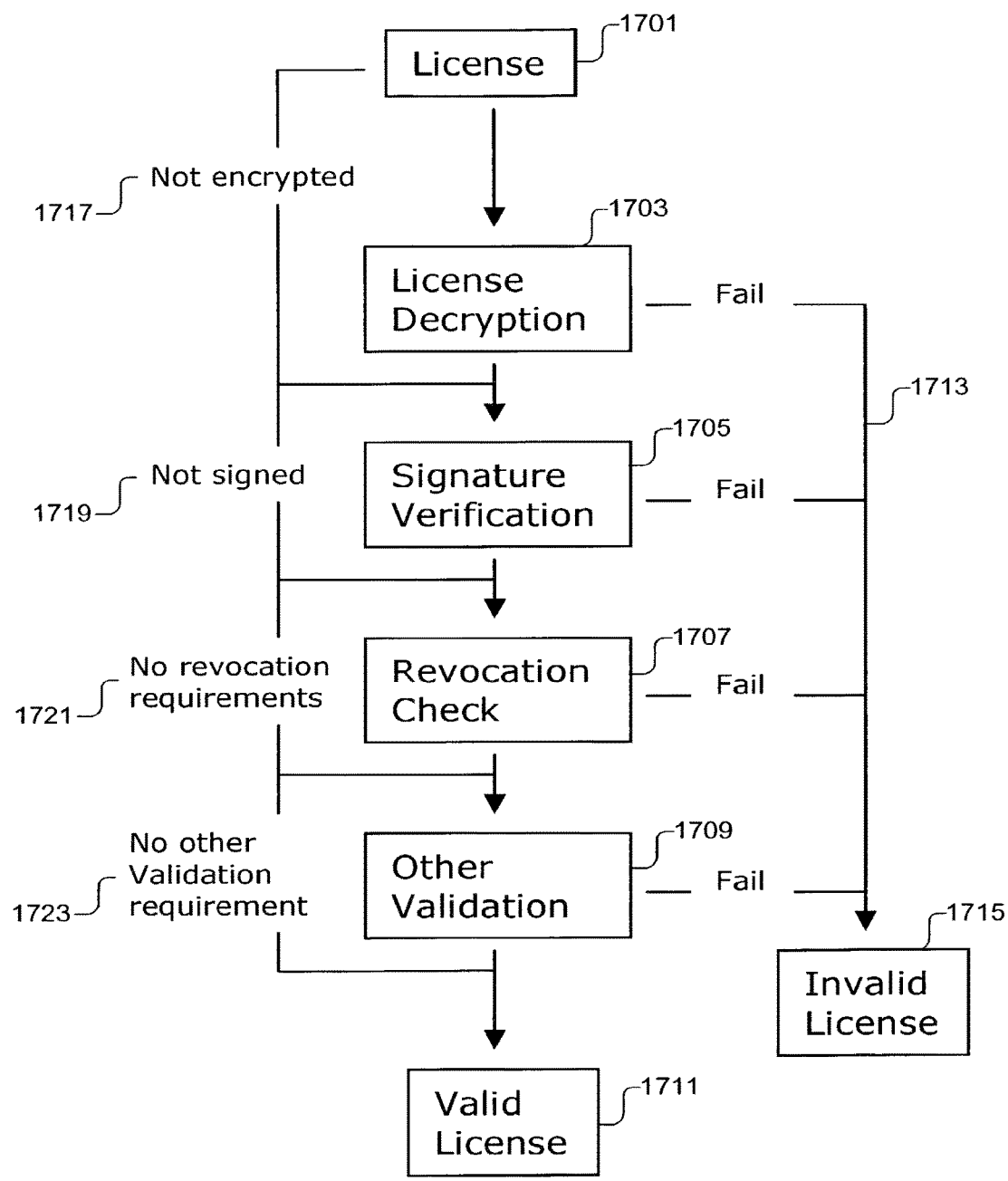
FIG. 17 illustrates an exemplary workflow for license validation that can be used in the Networked Services Licensing System of FIG. 1, according to an exemplary embodiment.

FIG. 17 illustrates an exemplary workflow for license validation that can be used in the Networked Services Licensing System 100 of FIG. 1. Validating a license, such as the license 127, the distribution license 305, and the like, as the name implies, for example, can include determining if a license is "valid," which typically involves employing a cryptographic technique, and the like. In an exemplary embodiment, the License Validation and Interpretation Service 109, and the like, can perform the license validation process.

Accordingly, in FIG. 17, at step 1701, for example, a license is received for validation. In an exemplary embodiment, the received license can be encrypted, for example, in order to keep the content thereof confidential, and the like. Accordingly, at step 1703, License Decryption, for example, the license can be decrypted. If, however, the license is not encrypted, as determined by step 1717, for example, the processes of step 1703 can be bypassed. In addition, if the decryption process on the received license fails, as determined by step 1713, at step 1715, for example, the license can be deemed invalid. In an exemplary embodiment, the encryption and/or decryption processes employed can be performed based on asymmetric cryptographic techniques, symmetrical cryptographic techniques, public key cryptographic techniques, private key cryptographic techniques, and the like.

At step 1705, Signature Verification and/or Integrity Check, for example, the integrity of the license can be checked, including determining the integrity of the license to insure that the license has not been changed from the when the license was created, digitally signed, and the like, by an authorized issuer, and the like. If, however, the license is not signed, as determined by step 1719, for example, the processes of step 1705 can be bypassed. In addition, if the verification process on the license fails, as determined by step 1713, at step 1715, for example, the license can be deemed invalid.

Although a license that fails the integrity check may not be trusted, a license that passes the integrity check may still entail the trusting of the key that was used to sign the license. Typically, the signer of the license is the issuer of the license. In an exemplary embodiment, the trusting of the issuer can be part of the license interpretation processes, and the verification process of step 1705 also can be performed based on asymmetric cryptographic techniques, symmetrical cryptographic techniques, public key cryptographic techniques, private key cryptographic techniques, and the like.

At step 1707, License Revocation Check, for example, in a similar as in the revocation of digitally signed documents, such as digital certificates, and the like, the license also can be revoked for various reasons. If, however, the license is not revoked, as determined by step 1721, for example, the processes of step 1707 can be bypassed. In addition, if the license revocation check on the license fails, as determined by step 1713, at step 1715, for example, the license can be deemed invalid. In an exemplary embodiment, the license revocation step can determine, for example, through appropriate methods, channels, and the like, whether or not the license has been revoked. In addition, in an exemplary embodiment, a revoked license is no longer a valid, and cannot be used to authorize the granting of rights.

At step 1709, Other Validation, for example, other validity checks, and the like, can be performed on the license. If the license passes the other validity checks employed, at step 1711, for example, the license can be deemed valid. Similarly, if no other validity checks are employed, as determined by step 1723, for example, the processes of step 1709 can be bypassed, and, at step 1711, for example, the license also can be deemed valid. In addition, if the other validity checks on the license fail, as determined by step 1713, at step 1715, for example, the license can be deemed invalid. In an exemplary embodiment, the license can include additional information to attest the validity of the license, such as a validity interval, a specific issuer for the license, and the like, and expired licenses can be considered no longer valid.

The processes of steps 1707 and 1709 can include determining information within the license, which can entail looking inside the license, and the like, as part of the validation process, according to an exemplary embodiment, because such steps can be more closely related to the validation of a license. However, from a computational point of view, such steps can be considered as part of a license interpretation process, according to a further exemplary embodiment.

Figure 18:
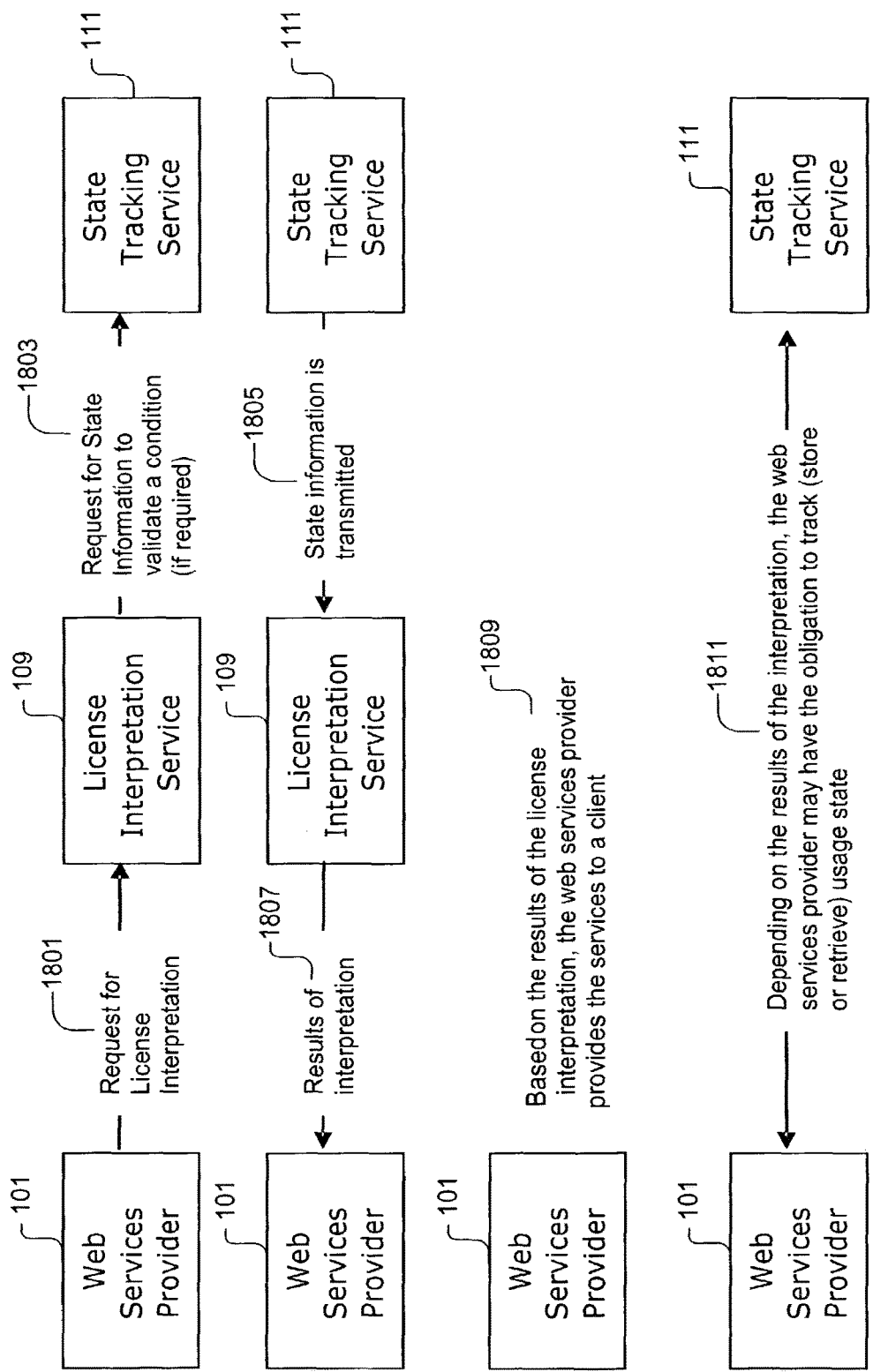
FIG. 18 illustrates exemplary workflows for license interpretation and state tracking that can be used in the Networked Services Licensing System of FIG. 1, according to an exemplary embodiments.

FIG. 18 illustrates exemplary workflows for license interpretation and state tracking that can be used in the Networked Services Licensing System 100 of FIG. 1. Interpreting a license, such as the license 127, the distribution license 305, and the like, for example, can include determining what the license has actually has authorized, conditions of such authorization, and the like. In an exemplary embodiment, as described below, license interpretation can be implemented as a service, wherein the License Validation and Interpretation Service 109, and the like, can perform the license interpretation processes. However, according further exemplary embodiments, a license interpreter can include, for example, any suitable component, device, system, sub-system, mechanism, software, and the like, capable of interpreting a license.

According to an exemplary embodiment, the Web Services Provider 101, upon receiving the request 121 for the service 119 along with the license 127 from the Web Services Client 103, can validate the license 127, for example, to ensure the integrity, authenticity, and the like, of the license 127. However, according a further exemplary embodiment as described below, the Web Services Provider 101, for example, can off-load the license 127 validation task to the License Interpretation Service 109. Advantageously, the License Interpretation Service 109 can maintain and/or check with external revocation mechanisms, and the like, for example, to determine if a signature associated with the license 127 is valid at the time the license 127 is used, and the like, thus, freeing up such resources and tasks for the Web Services Provider 101.

Accordingly, in FIG. 18, at step 1801, for example, the Web Services Provider 101 can make the license interpretation request 125, and transmit the license 127 to the License Interpretation Service 109. The Web Services Provider 101 can pass the request 127, for example, via any suitable communications protocol that can allow for the exchange of such queries, and the like. The interpretation of the license 127, for example, can include determining if the request 121 for the service 119 is authorized, under what conditions, if any, such authorization can be granted, and the like. Thus, such query can be, for example, in the form of "is requester X authorized to access resource Y?" and the like.

The interpretation of the license 127 also can involve determining, for example, if an issuer trusted by the Web Services Provider 101 has authorized the license 127. If, however, the Web Services Provider 101 does not recognize, cannot trust, and the like, the issuer of the license 127, then a license authorizing the issuer to issue the license 127, such as the distribution license 305, and the like, also can be checked.

At step, 1807, for example, the result of the license interpretation process can include a response, and the like, from the License Interpretation Service 109 to the Web Services Provider 101, indicating whether or not requested operations, access to services, and the like, granted in a license, such as the license 127, the distribution license 305, and the like, are authorized. Assuming a positive response from the License Interpretation Service 109, and assuming that no further conditions, such obligations 123, are employed, at step 1809, for example, the Web Services Provider can provide a service, such as the service 119, to a client, such as the Web Services Client 103.

In addition, zero or more obligations 123 that the Web Services Provider 101 may have to perform, for example, as conditions for supplying the service 119, and the like, can result from License Interpretation Service 109 evaluating such conditions specified in the license 127. For example, the obligation 123 can include the Web Services Provider 101 recording the access to the service 119, imposing a time limit for which the services 119 are rendered, and the like. At step 1811, in an exemplary embodiment, for example, the License Interpretation Service 109 also can leverage other services, for example, as specified in the license 127 and/or the distribution license 305, such as retrieving the state information 115, for example, including a count, a limit value, and the like, from some the other service, such as the State Tracking service 111, and the like.

Thus, according to an exemplary embodiment, a license, such as the license 127, the distribution license 305, and the like, can be used to specify information, such as location information, and the like, for other services, entities, and the like, such as the services, systems, sub-systems, components, devices, and the like, of the Networked Services Licensing System 100 of FIG. 1. In addition, the license interpretation workflow of the exemplary embodiments, for example, can employ any suitable license interpretation protocol, such as the exemplary license interpretation protocol described herein.

As described above, the License Interpretation Service 109, in the process of interpreting a license, such as the license 127, the distribution license 305, and the like, for example, can employ state information, such as the state information 115, and the like, that can be stored in a state tracking service, such as the State Tracking Service 111, and the like. The location, protocol, and the like, for obtaining the state information 115 can be encoded in the license, for example, based on Web services and/or languages, such as UDDI, WSDL, and the like. By virtue of validating the license, the License Interpretation Service 109 can assure that a link, reference, and the like, specified in the license is for an authorized service, such as the State Tracking Service 111, and the like. Accordingly, at step 1803, for example, the License Interpretation Service 109 transmits a request for state tracking to the State Tracking Service 111.

The State Tracking Service 111, however, may have to ensure that a requesting entity, such as the License Interpretation Service 109, can be authenticated. In an exemplary embodiment, the License Interpretation Service 109 can be authenticated, for example, by any suitable method, such as by presenting a license, such as the license 127, the distribution license 305, and the like. Then, at step 1805, for example, the State Tracking Service 111 provides the requested state 115 information to the License Interpretation Service 109. In an exemplary embodiment, the transfer of the state information 115 can be made using any suitable protocol, such as the exemplary protocols described herein, and can be made secure, for example, via secured transmission Internet technologies, such as Secure Sockets Layer (SSL) technologies, and the like.

The License Interpretation Service 109 then can use the state information 115 received from the State Tracking Service 111, at step 1807, for example, to complete the interpretation of the license. In an exemplary embodiment, the state information 115 can in clued, for example, how many times the service 119 has been accessed, a payment record, a time span, and the like.

As noted above, the License Interpretation Service 109 also can send interpretation information to the Web Services Provider 101, at step 1807, for example, including the obligations 123, and the like. Once the obligations 123 are satisfied, at step 1809, for example, the Web Services Client 103 can exercise a right included in the license 127, such access to the service 119 of the Web Services Provider 101.

As noted above, however, the use of the service 119 of the Web Services Provider 101 by Web Services Client 103, can entail obligations that may have to be fulfilled by the Web Services Provider 101, for example, such as transfer of updated state information 115, and the like. Accordingly, at step 1811, for example, the Web Services Provider 101 establishes contact with the State Tracking Service 111 to transfer the updated state information 115, and the like. The location, protocol, and the like, for transferring the updated state information 115 to the State Tracking Service 111 can be encoded in the license, for example, based on Web services and/or languages, such as UDDI, WSDL, and the like.

By virtue of the validity of the license, the Web Services Provider 101 can have assurance that a link, reference, and the like, specified in the license is for an authorized service, such as the State Tracking Service 111, and the like. The State Tracking Service 111, however, may have to ensure that a requesting entity, such as the Web Services Provider 101, can be authenticated. In an exemplary embodiment, the Web Services Provider 101 can be authenticated, for example, by any suitable method, such as by presenting a license, such as the license 127, the distribution license 305, and the like. Once validations, assurances, obligations, and the like, are satisfied, at step 1811, for example, the Web Services Provider 101 can transfer the updated state information 115 to the State Tracking Service 111.

In order to support the exemplary workflows of the described embodiments, the messages associated with the workflows, for example, used to indicate that a license may have to be employed, to request a license, to indicate that a license is valid, to indicate that a license invalid, and the like, can be encoded, using any suitable messaging protocol, such as the exemplary license protocol described herein. The exemplary license protocol, for example, can be encoded with XrML, XML, and the like, and can be included in messages that are sent between, for example, the Web Service Client and the Web Services Provider 101.

For example, an exemplary embodiment of the license protocol, employing XML and leveraging the messaging framework of SOAP, is illustrated in Table 1. In an exemplary embodiment, SOAP elements, such as the indication of a fault through a <fault> element during the processing of a message, and the like, can be used in accordance to the SOAP specification.

TABLE 1

Exemplary License Protocol (XML/SOAP Messaging Framework)

| Step in Workflow | Soap Message. Elements of the license protocol are prefixed with "lic:" |
|---|---|
| The Web Services Provider 101 response after the service 119 initiation without the license 127 by the Web Services Client 103. In this example, the protocol to indicate that the license 127 was not provided can be encapsulated in the <lic:faultDetails> element, shown in bold, and can include a "message" part that can be human readable, and an "errorcode" part for machine processing. The message part can be used for debugging. | <?xml version ='1.0'> <Envelop xmlns= "http://www.w3c.org/2002/06/soap-envelope" xmlns:lic= "http://www.xrml.org/2002/license">   <body>     <fault>     ...     <details>       <lic:faultDetails>         <message> license missing </message>         <errorcode> 0001 </errorcode>       <lic:faultDetails>     </details>     </fault>   </body> </envelope> |
| The Web Services Provider 101 response after the Web Services Client 103 service 119 initiation with an error in the license 127. In this example, the protocol to indicate that there was a fault condition with the license 127 can be encapsulated in the <lic:faultDetails> | <?xml version ='1.0'> <Envelop xmlns= "http://www.w3c.org/2002/06/soap-envelope" xmlns:lic= "http://www.xrml.org/2002/license">   <body>     <fault>     ...     <details>       <lic:faultDetails> |

TABLE 1-continued

Exemplary License Protocol (XML/SOAP Messaging Framework)

| Step in Workflow | Soap Message. Elements of the license protocol are prefixed with "lic:" |
|---|---|
| element, shown in bold, and can include: a "message" part that can be human readable, and an "errorcode" part for machine processing. The message part can be used for debugging. The errorcode part can be a number or a string and can include a list of error codes indicating different types of fault conditions. For example, 0034 for expired license, 0035 for un-trusted license, and the like. | ```<message> Expired License </message>
    <errorcode> 0034 </errorcode>
  <lic:faultDetails>
  </details>
  </fault>
 </body>
</envelope>``` |
| The error message can be followed by this message, including information for how to obtain the license 127. In this example, the fault message and the license information message can be bundled together. In the sample message, the fault message indicates that the license 127 was not provided, and the other message provides information on where to obtain the license 127. The element <lic:RetrievalInfo>, shown in bold, provides information on where to get the license 127 and what kind of license can be employed. In the sample message, a UDDI reference can be given, corresponding to the License Generation Service 105. In addition, a license with a grant of principal equal to the identity of the requester and of right "retrieveAnyDocument" can be employed. Further, a particular issuer can be employed as the issuer of the license 127. The license prototype 1503 or the type of license 127 employed to access the service 119 can be encoded with a rights language (for example, XrML, as in this example). | ```<?xml version ='1.0'>
<Envelop xmlns= "http://www.w3c.org/2002/06/soap-envelope"
         xmlns:lic= "http://www.xrml.org/2002/license"
         xmlns:x= "http://www.xrml.org/2002/xrmlCore" >
  <body>
    <fault>
    ...
    <details>
      <lic:faultDetails>
        <message> License Missing </message>
        <errorcode> 0034 </errorcode>
      </lic:faultDetails>
    </details>
    </fault>
    <lic:RetrievalInfo>
      <x:serviceReference>
        <x:uddi>
          <x:serviceKey>
            <x:uddi>E234s-asdfa-... </x:uddi>
          </x:serviceKey>
        </x:uddi>
      </x:serviceReference>
      <x:forAll varName= "requester" />
      <x:grant>
        <x:principal varRef= "requester" />
        <ws:retrieveAnyDocument />
      </x:grant>
      <x:issuer>
        ....
      </x:issuer>
    </lic:retrievalInfo>
  </body>
</envelope>``` |
| The Web Services Client 103 requesting the license 127. In this example, a requester, such as the Web Services Client 103, sends a message to the License Generation Service 105 in order to obtain the license 127. (For example, it can be assumed that the requester has been authorized to get a license and knows how to locate and interface with the License Generation Service 105). The message encapsulates the following elements, for example: A credential element in the <wsse:security> element in the <header> section - in the form of an X509 certificate A request in the <lic:request> element in the <body> section, shown in bold. The <lic:request> element can include a prototype grant identifying the service in question. It also can say that the principal is to be resolved at the time the license 127 is created. Also, there can be a type associated with the <lic:request> element. The output of such request (for example, if authorized) can be a license 127 that can be transmitted inside a message to the requester. | ```<?xml version ='1.0'>
<Envelop xmlns= "http://www.w3c.org/2002/06/soap-envelope"
         xmlns:lic= "http://www.xrml.org/2002/license"
         xmlns:x= "http://www.xrml.org/2002/xrmlCore" >
  <header>
    <wsse:security xmlns:wsse= "...">
      <wsse:binarySecurityToken
        id= "myToken"
        valueType= "wsse:x509v3"
        MIIEZzCCA9CgAwIBgIQEmtJZC0...
      </wsse:binarySecurityToken>
    </wsse:security>
  </header>
  <body>
    <lic:request type= "licenseGen">
      <x:forAll varName= "requester" >
        < "the wsse:security value" />
      </forAll>
      <x:grant>
        <x:principal varRef= "requester" />
        <ws:access />
        <x:serviceReference>
          <x:uddi>E234s-asdfa-... </x:uddi>
          <x:details>
          ...
          </x:details>
        </x:serviceReference>
      </x:grant>
    </lic:request>
  </body>``` |

TABLE 1-continued

Exemplary License Protocol (XML/SOAP Messaging Framework)

| Step in Workflow | Soap Message. Elements of the license protocol are prefixed with "lic:" |
|---|---|
| There are numerous ways to pass the information in the message. The example is one of such many ways. Each of the previously described methods can employ a separate "flavor" of the protocol. | `</envelope>` |
| The License Generation Service 105 delivers the license 127 to a requester, such as Web Services Client 103. In this example, the license can be returned as a fully formed license as part of the body of the message. With SOAP, typically, there is no need for an additional protocol, as shown in the example. However, with other mechanisms, there may be a need to include the license within a "wrapper" in the form of `<lic:Response>` . . . `</lic:Response>` to indicate that the enclosed license is a response to a request and not a license that was generated for other purposes. | `<?xml version ='1.0'>`<br>`<Envelop xmlns= "http://www.w3c.org/2002/06/soap-envelope"`<br>`         xmlns:lic= "http://www.xrml.org/2002/license"`<br>`         xmlns:x= "http://www.xrml.org/2002/xrmlCore" >`<br>`  <header>`<br>`    ...`<br>`  </header>`<br>`  <body>`<br>`    <x:license>`<br>`      <x:grant>`<br>`        ...`<br>`      </x:grant>`<br>`      ...`<br>`    </x:license>`<br>`    ...`<br>`  </body>`<br>`</envelope>` |
| The Web Services Client 103 transmits the license 127 (for example, as token to gain access to the service 119) with service initiation message. In this example, transmitting the license 127 as a token for access to the service 119, leverages the semantics of the messaging protocol, in SOAP, which is a security token passed in the header portion of the message. With SOAP, typically, there is no need for an additional protocol, as shown in the example. However, with other mechanisms, there may be a need to include the license within a "wrapper" in the form of `<lic:security>` . . . `</lic:security>` to indicate that the enclosed license 127 is a license to gain access to the service 119. | `<?xml version ='1.0'>`<br>`<Envelop xmlns= "http://www.w3c.org/2002/06/soap-envelope"`<br>`         xmlns:lic= "http://www.xrml.org/2002/license"`<br>`         xmlns:x= "http://www.xrml.org/2002/xrmlCore" >`<br>`  <header>`<br>`    <wsse:security xmlns:wsse= "...">`<br>`    </wsse:security>`<br>`    <x:license>`<br>`      <x:grant>`<br>`        ...`<br>`      </x:grant>`<br>`      ...`<br>`    </x:license>`<br>`    </wsse:security>`<br>`  </header>`<br>`  <body>`<br>`    ...`<br>`  </body>`<br>`</envelope>` |

The exemplary license interpretation protocol, as illustrated in Table 2, for example, can be part of the license protocol. The license interpretation protocol is discussed separately, for the sake clarity. The Web Services Provider 101 can use the license interpretation protocol, for example, when invoking the License Interpretation Service 109. Similar to the license protocol, the license interpretation protocol can be implemented so as to leverage a messaging exchange protocol, for example, SOAP, and the like, and transmit XrML messages, XML messages, and the like. Table 2 shows the exemplary license interpretation protocol, for example, as XML leveraging the messaging framework of SOAP, and the rights language XrML.

TABLE 2

Exemplary Interpretation Protocol (XML/SOAP Messaging Framework)

| Step in Workflow | Soap Message. Elements of the license protocol are prefixed with "lic:" |
|---|---|
| The Web Services Provider 101 sends a request message 125 to the License Interpretation Service 109 to request the interpretation of a license, such as the license 127. In this example, the message can include several parts: In the header, the Web Services Provider 101 can sends credential, including a license that authorizes the access or use of the service The body of the message starts with | `<?xml version ='1.0'>`<br>`<Envelop xmlns= "http://www.w3c.org/2002/06/soap-envelope"`<br>`         xmlns:lic= "http://www.xrml.org/2002/license"`<br>`         xmlns:x= "http://www.xrml.org/2002/xrmlCore" >`<br>`  <header>`<br>`    ...`<br>`    <wsse:security xmlns:wsse= "...">`<br>`      ...`<br>`    </wsse:security>`<br>`    <x:license>`<br>`      <x:grant>`<br>`        ...` |

TABLE 2-continued

Exemplary Interpretation Protocol (XML/SOAP Messaging Framework)

| Step in Workflow | Soap Message. Elements of the license protocol are prefixed with "lic:" |
|---|---|
| the request of type "licenseInterpret," shown in bold. This is to indicate that the request is for interpreting a license. Within this element are the parameters that the interpreter employs as input. The example shows that a principal and a resource are passed as parameters signifying that the service will find the granted rights that match those parameters. Following the request is the license or licenses to be interpreted. | `</x:grant>`<br>...<br>`</x:license>`<br>`</wsse:security>`<br>...<br>`</header>`<br>`<body>`<br>  `<lic:request type= "licenseInterpret"`<br>      `ID= "1234-1234-1234-1234">`<br>    `<lic:parameter principal= "x:keyholder">`<br>      MIIEZzCCA9CgAwIBgIQEmtJZC0...<br>    `</lic:parameter>`<br>    `<lic:parameter resource= "x:uddi">`<br>      E234s-asdfa-...<br>    `</lic:parameter>`<br>    ...<br>  `</lic:request>`<br>  `<x:license>`<br>    `<x:grant>`<br>      ...<br>    `</x:grant>`<br>    ...<br>  `</x:license>`<br>  ...<br>`</body>`<br>`</envelope>` |
| The License Interpretation Service 109, after the license interpretation request 125, returns the results in a message. In this example, a response 123 corresponding to the request is encapsulated within the `<lic:response>` element, shown in bold. In this example, the returned parameters are grant fragments (for example, as defined in the rights language) that match the principal and the resource in the original request. Certain conditions can also be resolved in the license interpreter and the result could be "simpler conditions" that are easier to validate by the requester. The result in this example indicates that the access right has been granted - with no conditions or obligations, and the right to execute has also been granted, but with the obligation to track the exercise of this right as specified by the `<x:trackReport>` element (for example, defined in the rights language XrML) | `<?xml version ='1.0'>`<br>`<Envelop xmlns= "http://www.w3.org/2002/06/soap-envelope"`<br>      `xmlns:lic= "http://www.xrml.org/2002/license"`<br>      `xmlns:x= "http://www.xrml.org/2002/xrmlCore" >`<br>`<header>`<br>  ...<br>`</header>`<br>`<body>`<br>  `<lic:response type= ID= "1234-1234-1234-1234">`<br>    `<x:grant>`<br>      `<ws:access/>`<br>    `</x:grant>`<br>    `<x:grant>`<br>      `<ws:execute/>`<br>      `<x:trackReport>`<br>        `<x:serviceReference>`<br>          `<x:uddi>E234s-asdfa-... </x:uddi>`<br>          `<x:details>`<br>            ...<br>          `</x:details>`<br>        `</x:serviceReference>`<br>      `</x:trackReport>`<br>    `</x:grant>`<br>    ...<br>  `</lic:response>`<br>  ...<br>`</body>`<br>`</envelope>` |

In an exemplary embodiment, the state tracking protocol can include any suitable protocol, public, private, proprietary, standardized, the exemplary protocols as described herein, and the like, that can be used to retrieve, transfer, and the like, information, such as the state information 115, and the like, to and from a service, such as the State Tracking Service 111, and the like. Accordingly, the state tracking protocol can be used for retrieving a count of how many times a service, such as the service 119, and the like, has been exercised, for sending the exercise count, for storing an exercise count, and the like.

In addition, the exchange of certain types of information, such as payment information, time information, and the like, may already be standardized in a protocol by other industries, in which case, according to a further exemplary embodiment, such a standardized protocol can be included in the state tracking protocol. Further, according to a still further exemplary embodiment, a protocol may employed that can depend on the specialization, implementation, and the like, of the State Tracking Service 111. For example, if the State Tracking Service includes a database, then the retrieval and storage of information can be performed via a database query mechanism, and the like.

Exemplary use scenarios, business applications, and the like, that can be supported by the exemplary embodiments of the Networked Services Licensing System 100 of FIG. 1, as will now be described.

Figure 19:
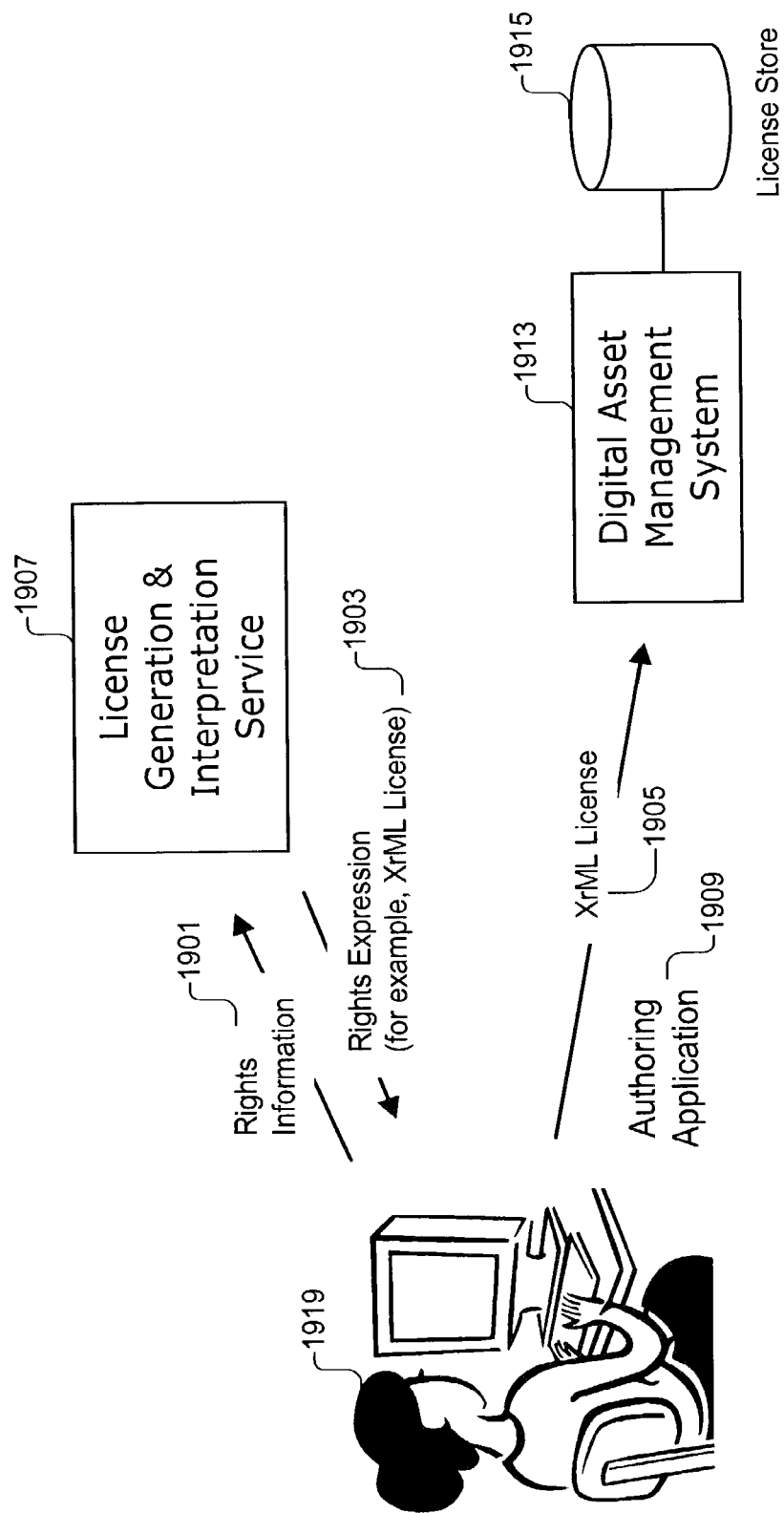
FIG. 19 illustrates an exemplary workflow for specifying a license that can be used in the Networked Services Licensing System of FIG. 1, according to an exemplary embodiment.

FIG. 19 illustrates an exemplary workflow for specifying a license that can be used in the Networked Services Licensing System 100 of FIG. 1. In this example, a service, such as a Web-based License Generation and Interpretation Service 1907 based on, for example, the License Generation 105 and Interpretation 109 Services of the exemplary embodiments, and the like, can allow for the specification of rights, the interpretation of rights, and the like, for generating a license, such as the license 127 and/or the distribution license 305, and the like. According to an exemplary embodiment, the License Generation and Interpretation Service 1907, for example, can be employed as a building block for systems, such as a Rights Clearing Service, a Digital Asset Management System, a Digital Rights Management System, and the like.

The License Generation and Interpretation Service 1907, in an exemplary embodiment, can include, for example, providing a user interface, such as a Graphical User Interface (GUI), and the like, converting user input into a rights expression, such as a license, based on a rights language, such as XrML, and the like. The License Generation and Interpretation Service 1907, according to a further exemplary embodiment, for example, can also provide one or more user interfaces, each specializing in a particular format, industry, and the like. For example, the License Generation and Interpretation Service 1907 can provide a user interface for video formats, another user interface for music formats, a still further user interface for electronic books, and the like. Advantageously, providing user interfaces tailored to the specific details and/or intricacies of a particular audience, for example, can be a value-added feature, and the like, of the License Generation and Interpretation Service 1907.

Accordingly to an exemplary embodiment, the License Generation and Interpretation Service 1907, for example, can include accepting rights queries, processing the rights queries against corresponding rights expressions, and the like. For example, an exemplary rights query can be of the form "Does John M., who is an employee of Company N, have the right to purchase up to $1000 worth of supplies from Supplier P?," and the like. The output from such a query, for example, can include an assertion about what rights are available, what conditions are attached to such rights, and the like. The License Generation and Interpretation Service 1907 can add further value, for example, by providing one or more user interfaces that facilitate user input for a particular type of rights query, and the like.

Advantageously, employing the same entity for providing both rights specification, and rights interpretation functions, for example, allows for an increase in consistency, accuracy, and the like, in interpreting the rights. In other words, a system that creates the rights specification typically is better equipped to apply the same rules when interpreting such rights. In an exemplary embodiment, the rights expression, the rights expression definitions, the rights expression interpretations, and the like, can be based on any suitable standard, including industry standards, and the like.

Accordingly, in an exemplary embodiment, a user 1919, an author, for example, wishes to specify the rights associated with some type content in relation to a contract with a publisher. An authoring application 1909 that the user 1919 employs does not provide a way to specify rights metadata for the content, but can call a Web service, such as the License Generation and Interpretation Service 1907 that provides such a function.

Accordingly, at step 1901, for example, the authoring application connects to License Generation and Interpretation Service 1907 that provides rights specification, interpretation, and the like. For example, the License Generation and Interpretation Service 1907 can specialize in certain industries and provide a user interface with terminology, contract templates, and the like, that can be used and understood in that particular industry, trade, and the like. The user 1919 interacts with the License Generation and Interpretation Service 1907, and, at step 1903, for example, the License Generation and Interpretation Service 1907 converts the information the user 1919 provides into a rights expression, for example, an unsigned license, based on XrML, and the like. The unsigned license is then returned, conveyed, transmitted, and the like, to the user 1919, and the user 1919 can digitally sign the license.

At step 1905, for example, the user 1919 can send the signed license, for example, together with the associated content, to a Digital Asset Management System 1913 of the publisher, and, for example, including a license store 1915, such as a database and the like. The content can now be managed by the Digital Asset Management System 1913, for example, within a domain, and the like, of the publisher.

Figure 20:
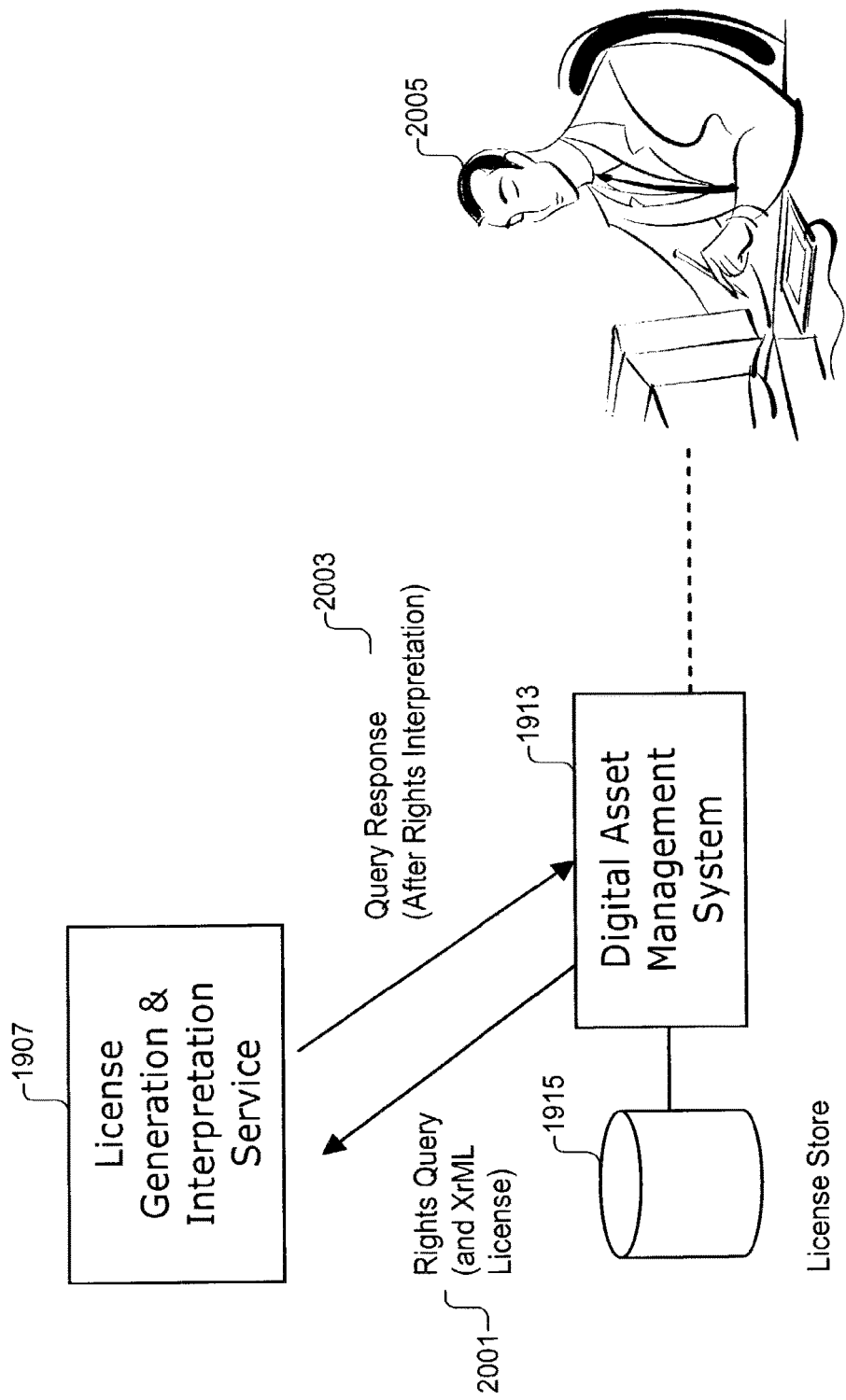
FIG. 20 illustrates an exemplary workflow for interpreting a license that can be used in the Networked Services Licensing System of FIG. 1, according to an exemplary embodiment.

FIG. 20 illustrates an exemplary workflow for interpreting a license that can be used in the Networked Services Licensing System 100 of FIG. 1. For example, in FIG. 20, during a production workflow for a publication, Bob, a rights specialist, wishes to query the rights of a particular asset of the Digital Asset Management System 1913. In this example, the rights of the asset are encapsulated, for example, by an XrML license. The Digital Asset Management System 1913, for example, not having a capability to interpret licenses, for example, by design, because a Web service can provide more specialized capabilities, and the like, accesses the License Generation and Interpretation Service 1907, which provides, for example, an intuitive user interface, such as a GUI, and the like. Advantageously, the License Generation and Interpretation Service 1907 can specialize in interpretation of certain types contracts, licenses, and the like, and allow the operation of the user interface to query the rights that can be employed for a particular publication. In an exemplary embodiment, the License Generation and Interpretation Service 1907 can include, for example, an indexed database where licenses are stored, organized, and the like.

Accordingly, at step 2001, for example, Bob sends a query along with the XrML license, for example, through the Digital Asset Management System 1913, to the License Generation and Interpretation Service 1907. Then, at step 2003, for example, the License Generation and Interpretation Service 1907 interprets the rights included in the license based on the query request, and returns the result of the query to Bob.

Exemplary Workflow for Accessing the License Issuing and Interpretation Service 1907

Although the exemplary rights processing workflow described above can be a function provided by a Web service, such as the License Generation and Interpretation Service 1907, the workflow does not describe the process for calling, accessing, and the like, the License Generation and Interpretation Service 1907. For example, in an exemplary embodiment, the XrML license is not used for accessing the License Generation and Interpretation Service 1907. Accordingly, the rights processing functions can be generic functions provided by a Web service, such as the License Generation and Interpretation Service 1907, and the like, and, for example, can be described with any suitable standards-based language for describing Web services, such as WSDL, and the like.

In many business scenarios, however, it can become advantageous to manage access to a service, such as the License Generation and Interpretation Service 1907, and the like. For example, a user 2005, the owner of the Web-based License Issuing and Interpretation Service 1907 has been providing the service to anyone that can discover his offering, can use the service, and the like. However, the License Generation and Interpretation Service 1907 of the user 2005 has become quite successful, and the user 2005 now wishes to commercialize the License Issuing and Interpretation Service 1907. According to an exemplary embodiment, the user 2005 can add an e-commerce capability to the License Issuing and Interpretation Service 1907.

Accordingly, the user 2005, for example, could add an e-commerce package to the License Issuing and Interpretation Service 1907, which can entail the creation of various mechanisms, such as a customer account processing mechanism, a financial transaction processing mechanism, a login and password processing mechanism, and the like. However, such a service can create barriers for the service and its customers. For example, the login process, the handling forgotten passwords, the processing of payments, the determining of how much to charge, the determining of what methods to employ, and the like, could become cumbersome.

Therefore, according to a further exemplary embodiment, the user 2005 can configure the License Issuing and Interpretation Service 1907, for example, such that access is granted based on a presentation of a license, for example, manually, automatically, and the like. Conceptually, such a system can include, for example, submitting a license during the initial communication protocol with the License Issuing and Interpretation Service 1907. In an exemplary embodiment, a client of the License Issuing and Interpretation Service 1907 and the License Issuing and Interpretation Service 1907 can follow any suitable license protocol, such as the exemplary license protocol described herein. In this exemplary embodiment, a license, such as an XrML license, and the like, can be presented, for example, when an application communicates with the License Issuing and Interpretation Service 1907. If the license validates, the services of the License Issuing and Interpretation Service 1907 can be rendered.

Figure 21:
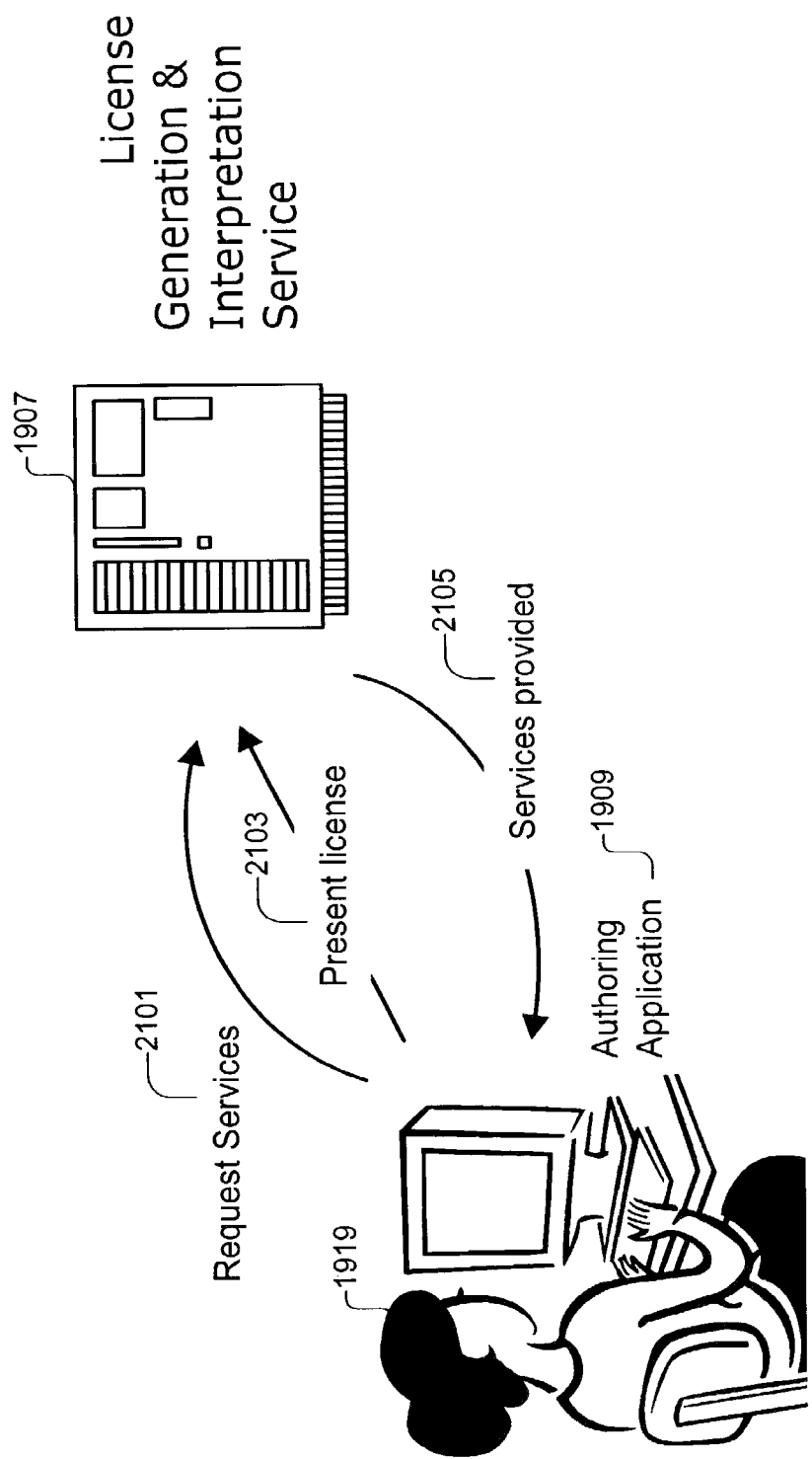
FIG. 21 illustrates an exemplary workflow for controlling consumption of a service that can be used in the Networked Services Licensing System of FIG. 1, according to an exemplary embodiment.

In the examples of FIGS. 19 and 20, the authoring application can be configured to include the capability to present a license, for example, when the application requests services from License Issuing and Interpretation Service 1907. FIG. 21 illustrates an exemplary workflow for controlling consumption of a service that can be used in the Networked Services Licensing System 100 of FIG. 1. In FIG. 21, at step 2101, for example, authoring application 1909 of the user 1919 communicates with the License Issuing and Interpretation Service 1907 and requests service. At step 2103, for example, during the initial protocol, a license is presented in order to access the services of the License Issuing and Interpretation Service 1907. Then, at step 2105, for example, upon acceptance of the license, the License Issuing and Interpretation Service 1907 can render its services.

The user 2005 now ponders the question of who would issue the licenses that are used to access the License Issuing and Interpretation Service 1907. According to an exemplary embodiment, the user 2005 can configure the License Issuing and Interpretation Service 1907 to manage the issuing of the licenses. However, this can become quite taxing to the system and himself.

In addition, the user 2005 would have develop and maintain an e-commerce site and a database for his customers. However, the user 2005 figures that managing a customer database is not something that will add value to the License Issuing and Interpretation Service 1907, and does not see the economic potential of maintaining and/or datamining the customer database.

Accordingly, the user 2005 would rather keep the License Issuing and Interpretation Service 1907 simple, allowing the user 2005 to focus on the basic capabilities and functionality of the service. Therefore, according to a further exemplary embodiment, the user 2005 can configure the License Issuing and Interpretation Service 1907 to employ licenses, for example, that can be issued by a trusted third party, bundled with the authoring application 1909, and the like.

Figure 22:
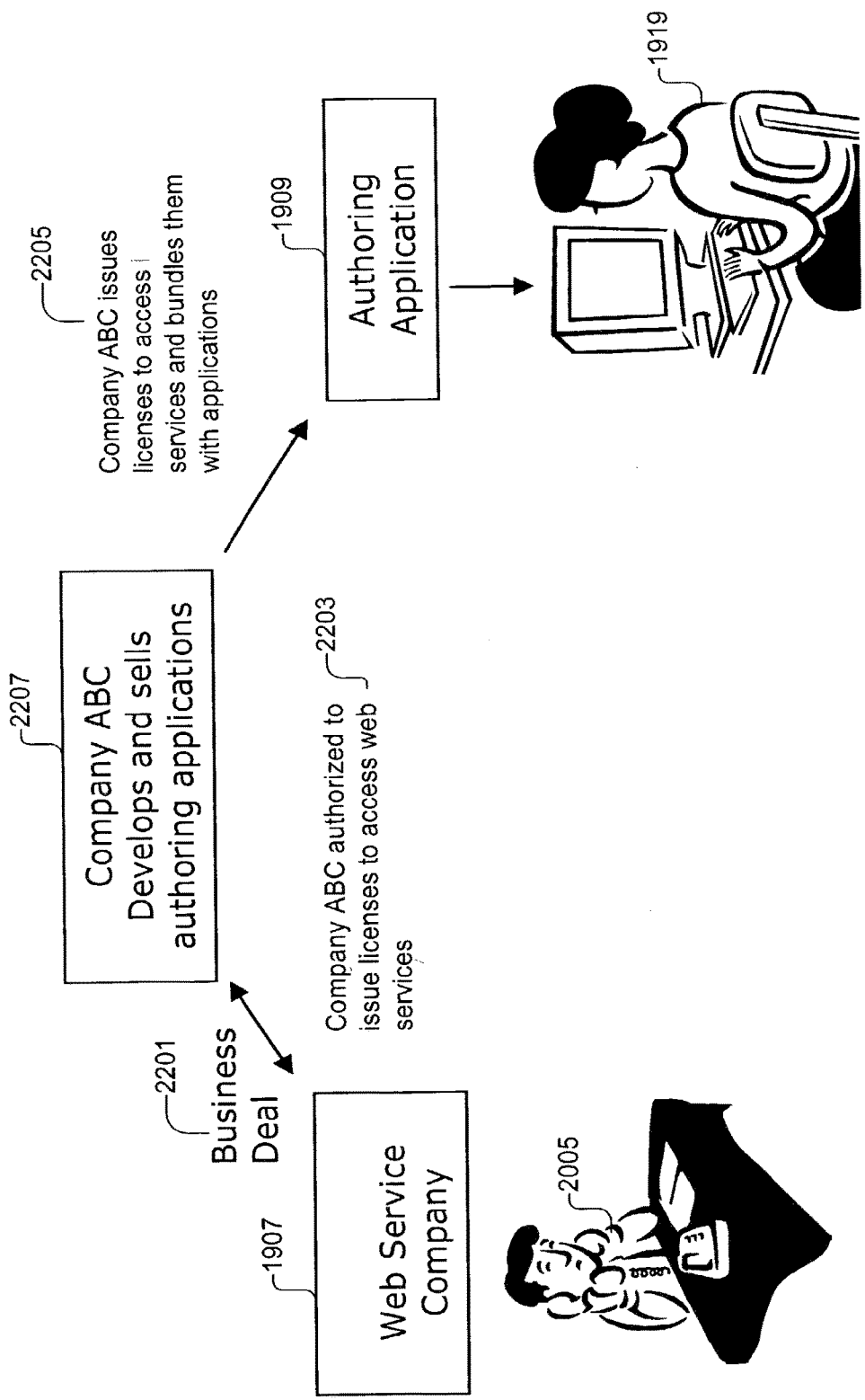
FIG. 22 illustrates an exemplary workflow for issuing licenses by a third party that can be used in the Networked Services Licensing System of FIG. 1, according to an exemplary embodiment.

FIG. 22 illustrates an exemplary workflow for issuing licenses by a third party that can be used in the Networked Services Licensing System 100 of FIG. 1. For example, in an exemplary embodiment, the user 2005 can issue licenses to business partners of the user 2005, for example, granting the right to issue licenses for access to License Issuing and Interpretation Service 1907, such as the distribution license 305, and the like. The business partners of the user 2005 then can issue the distribution licenses to end-users, such as the user 1919.

For example, the business partners the user 2005 can include companies, for example, such as Company ABC 2207 that creates and sells the authoring applications 1909, such as word processors, image creation software, and the like. At step 2201, for example, the user 2005 can make a business deal with the Company ABC 2207, for example, based on granting the Company ABC 2207 the right to issue licenses for access to the License Issuing and Interpretation Service 1907, and the like, at step 2203. Then, at step 2205, for example, the licenses for accessing the License Issuing and Interpretation Service 1907 can be issued on-demand, bundled with the authoring applications 1909, and the like, by the Company ABC 2207. Advantageously, in this exemplary embodiment, the user 2005 can bundle access to the License Issuing and Interpretation Service 1907 with a third party application, such as the authoring applications 1909, and the like.

In an exemplary embodiment, the user 2005 and/or the Company ABC can use a third party service, such the License Generation and Issuing Service 105, and the like, to generate the licenses of the exemplary embodiments. In addition, signature keys can to be obtained to sign the licenses, for example, through security services, such as the Trust Authority Service 113, and the like.

According to the exemplary embodiments, the user 2005 can commercialize the Web-based License Issuing and Interpretation Service 1907, advantageously, without adding the resources employed to run and manage an e-commerce system. The user 2005 can determine the conditions for access to the License Issuing and Interpretation Service 1907, for example, by employing the licenses of the exemplary embodiments, such as XrML licenses, and the like. Advantageously, according to the exemplary embodiments, the user 2005 does not have to deal, for example, with managing of the customer base, and the like. The improved License Issuing and Interpretation Service 1907, for example, can entail some improvement to the Web services software, such as the capability to process licenses, but the such changes can be negligible in comparison with the deployment of a full-fledge e-commerce setup.

According to exemplary embodiments, the user 2005 can employ various compensation methods that, advantageously, can be described in a rights language, such as XrML, and the like. For example, according to an exemplary embodiment, a non-tracked, not encoded in a license, out of band, and the like, compensation method can be employed. In this exemplary compensation method, the user 2005 can arrange a flat-fee, per-use, and the like, deal, whereby the user 2005 can issue a distribution license, for example, granting the Company ABC 2207 an unlimited right to issues licenses for accessing the License Issuing and Interpretation Service 1907. The Company ABC 2207 can compensate the user 2005, for example, based on the number of licenses for accessing the License Issuing and Interpretation Service 1907 the Company ABC 2207 bundles with its software, such as the authoring applications 1909, based on a one-time payment, and the like. In this embodiment, the user 2005 would have to trust the data that the Company ABC 2207 collects, for example, with respect to software sales, and the like.

According to an exemplary embodiment, a tracked, encoded in a license, per distributor use, and the like, compensation method can be employed. In this exemplary compensation method, the user 2005 can employ, for example, compensation rules, and the like, that can be encoded in the distribution license the user 2005 issues to the Company ABC 2207. For example, the distribution license can be configured to specify that every time the right to issue a license for accessing the License Issuing and Interpretation Service 1907 is exercised by the Company ABC 2207, conditions may have to be met, such as the making of a payment of a certain amount to an account of the user 2005, that each use of the distribution license is tracked and settled through other means, and the like. Advantageously, with this exemplary embodiment, accurate, trustworthy, and the like, sales information can be made possible, because accurate tracking can be enabled.

According to an exemplary embodiment, a tracked, encoded in a license, per end-user use, and the like, compensation method can be employed. In this exemplary compensation method, the distribution license that the user 2005 issues to the Company ABC 2207 can also specify, for example, that when an end-user license is issued, for example, by the Company ABC 2207, certain rights, conditions, and the like, may have to be specified in the end-user licenses that the Company ABC 2207 issues. For example, the user 2005 can specify in the distribution license that the end-user usage of the licenses issued by the Company ABC 2207 for accessing the License Issuing and Interpretation Service 1907 be tracked, and the like. Accordingly, when the License Issuing and Interpretation Service 1907 of the user 2005 receives, processes, and the like, a license from the user 1919, the license can specify the parameters to track the usage of the license. Advantageously, with this exemplary embodiment, at the end of an accounting period, such data can be gathered, processed, and the like, for payment.

In an exemplary embodiment, the Company ABC 2207 may realize that by bundling additional services, the Company ABC 2207 can increase its competitive advantage in the marketplace. In this exemplary embodiment, for example, the Company ABC 2207 can reach out to other companies, Web services, and the like, such as document translator services, multilingual spell checker services, editorial tool services, and the like. Then, the Company ABC 2207 can make business deals with such other companies and include licenses that can be used to access such additional services. Advantageously, with this exemplary embodiment, the Company ABC can aggregate several services to bundle with its products.

In an exemplary embodiment, each license, such as an XrML license, and the like, can be used to express individual rights, conditions, and the like, for each the aggregated services. For example, the license for Web service B can be expressed with a right for an unlimited use, the license for Web service C can be expressed with a condition for a maximum count of 10 uses, and the like. Advantageously, with this exemplary embodiment, employing licenses that can determine the rules for access and use of a service can facilitate service aggregation.

According to an exemplary embodiment, the user 2005 can issue distribution licenses to his business partners, and, in turn, his business partners can issue licenses to the end-users for accessing the License Issuing and Interpretation Service 1907. This exemplary embodiment illustrates a single tier distribution model, wherein the business partners of the user 2005 can be the distributors for access to the services of the user 2005.

Figure 23:
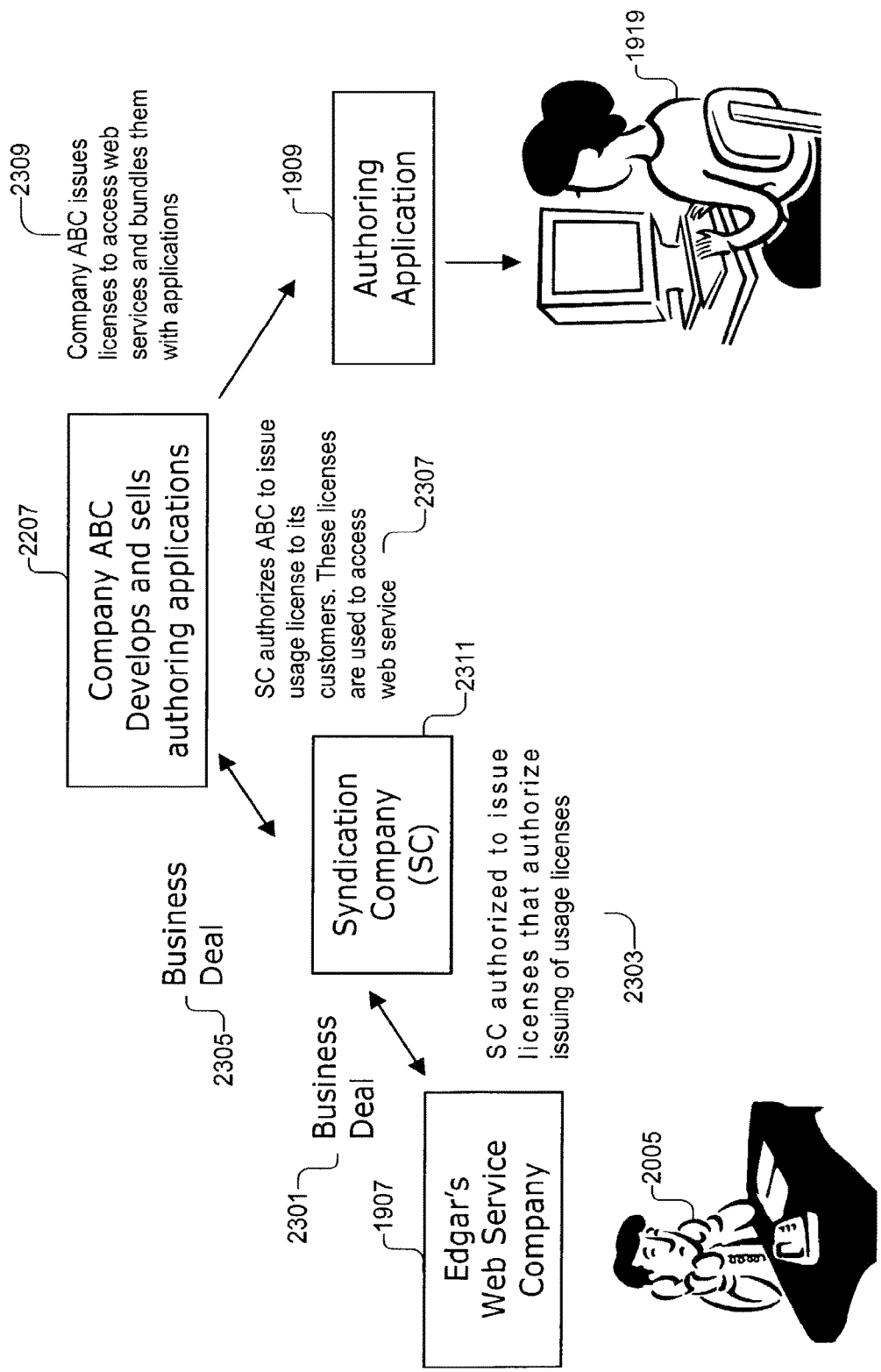
FIG. 23 illustrates an exemplary workflow for syndication of a service that can be used in the Networked Services Licensing System of FIG. 1, according to an exemplary embodiment.

FIG. 23 illustrates an exemplary workflow for syndication of a service that can be used in the Networked Services Licensing System 100 of FIG. 1. According to a further exemplary embodiment, however, the user 2005 can focus on the technical details of the Web-based License Issuing and Interpretation Service 1907, and, for example, outsource business dealings, and the like, with companies, such as the Company ABC 2207, and the like. In this exemplary embodiment, in essence a syndication model, the user 2005 can grant a syndication agent, such as a Syndication Company 2311, a syndication license that grants the Syndication Company 2311 the right to issue distribution licenses that grant the ABC Company 2207 the right to issue licenses for accessing the License Issuing and Interpretation Service 1907.

The Networked Services Licensing System 100, for example, as described with respect to FIGS. 1-23, can store information relating to various processes described herein. This information can be stored in one or more memories, such as a hard disk, optical disk, magneto-optical disk, RAM, and the like, of the devices and sub-systems of Networked Services Licensing System 100. One or more databases of the devices and subsystems of the Networked Services Licensing System 100 of FIG. 1 can store the information used to implement the exemplary embodiments. The databases can be organized using data structures, for example, records, tables, arrays, fields, graphs, trees, lists, and the like, included in one or more memories, such as the memories listed above, and the like.

All or a portion of the Networked Services Licensing System 100, for example, as described with respect to FIGS. 1-23, can be conveniently implemented using one or more general-purpose computer systems, microprocessors, digital signal processors, micro-controllers, and the like, programmed according to the teachings of the exemplary embodiments. Appropriate software can be readily prepared by programmers of ordinary skill based on the teachings of the exemplary embodiments. In addition, the Networked Services Licensing System 100 can be implemented by the preparation of application-specific integrated circuits or by interconnecting an appropriate network of conventional component circuits.

Although the present invention is described in terms of exemplary workflows, other workflows are possible, as will be appreciated by those skilled in the relevant art(s). For example, during services initiation, typically a license is presented at the time of service request. However, it is possible that the license be presented at another time, cached, and the like, so that further service request do not entail the submission of a license. A license could be "pre-presented" and retained by the Web service, the client, and the like. The license could, after being pre-presented, be "pre-validated." In such a case, when a request for accessing services is made it would be determined if the request is from an authorized requestor, and the license would be interpreted.

Although the exemplary workflows are described as functional steps associated with the exemplary devices of the Networked Services Licensing System 100, one or more of the functional steps of the exemplary workflows can be performed by any suitable device or devices, such as one or more general-purpose computer systems, microprocessors, digital signal processors, micro-controllers, and the like, programmed according to the teachings of the exemplary embodiments, as will be appreciated by those skilled in the relevant art(s).

Although the present invention is described in terms of Web services, the present invention is applicable to other services, such as any suitable distributed network service, and the like, as will be appreciated by those skilled in the relevant art(s).

Although the present invention is described in terms of a Web services model, the present invention is applicable to other models, such as a syndication model that is replicated for services, and the like, as will be appreciated by those skilled in the relevant art(s). For example, in an exemplary embodiment, a third party collects services from service providers and makes them available singly or in combination to users as a third party service.

In such an example, the Web Services Provider 101 may not or, cannot provide the syndication function, but they can set some of the conditions, rights, and the like, for the services. This exemplary embodiment, thus, enables the third party service provider to provide, for example, access and tracking services to a user of the third party service on behalf of the owners of the services. Advantageously, the services market, especially for component services, can be greatly enabled, accelerated, and the like, with this exemplary embodiment. By contrast, conditional access typically cannot handle such examples well and/or may be impractical.

Although the present invention is described in terms of an "on-line" mode of operation, the present invention is applicable to other modes of operation, such as "offline" modes, and the like, as will be appreciated by those skilled in the relevant art(s). For example, a hard drive on a personal computer (PC) can include license generating software, a license, and license interpretation software. The communications protocol of the exemplary embodiments, in this example, can be employed for communications within the hard drive.

Advantageously, the Web Services Client 103 can present a validated license and obtain access to a Web service without having to be on-line at the time the service is obtained. For example, the service could reside on the PC hard drive, such as where the service includes the execution of a computer program, or could be obtained from or through another device, such as a server or CD or other storage medium.

To the extent an on-line transaction is employed for some reason, such as for making a financial payment, the on-line session can be conducted at a time other than at the time the request for the use of the service is made. In the case of a financial transaction, the transaction can be made off-line using a digital storage device, such as a pre-paid "smart card" and the like. In addition, any suitable information to be exchanged can be exchanged using a physical storage device instead of an on-line communication. For example, a license can be presented by inserting a smart card into the PC.

While the present invention have been described in connection with a number of exemplary embodiments and implementations, the present invention is not so limited, but rather covers various modifications, equivalent arrangements, and the like, which fall within the purview of the appended claims.

What is claimed is:

1. A method executed by one or more server-side computing devices associated with a Web service provider for controlling consumption of content, provided by the Web service to a client device, in accordance with rights expression information associated with the content to allow the content to be rendered on the client device, the method comprising:

authenticating, by at least one of the one or more server-side computing devices, at least one of the one or more server-side computing devices with an authorization entity, the authorization entity being external to the one or more server-side computing devices;

receiving, by at least one of the one or more server-side computing devices, a request to render content from a client device associated with a user;

transmitting to the authorization entity, by at least one of the one or more server-side computing devices, a request to provide the Web service;

receiving, by at least one of the one or more server-side computing devices, an authorization from the authorization entity to provide the Web service in response to a determination by the authorization entity that the user is authorized to use the Web service to render the content;

receiving, by at least one of the one or more server-side computing devices, rights expression information associated with content, the rights expression information including conditions of use of the content;

interpreting, by at least one of the one or more server-side computing devices, the rights expression information; and providing, by at least one of the one or more server-side computing devices, the content to the client device for consumption of the content based on the rights expression information.

2. The method of claim 1, wherein the rights expression information is expressed using a rights expression language.

3. The method of claim 2, wherein the rights expression language is a grammar-based rights expression language.

4. The method of claim 3, wherein the grammar-based rights expression language includes eXtensible rights Markup Language (XrML).

5. The method of claim 1, wherein providing the content to the client device for consumption includes transmitting the content to the client device.

6. A server-side apparatus associated with a Web service provider for controlling consumption of content, provided by the Web service to a client device, in accordance with rights expression information associated with the content to allow the content to be rendered on the client device, the apparatus comprising:

one or more processors; and one or more memories operatively coupled to at least one of the one or more processors and having instructions stored thereon that, when executed by at least one of the one or more processors, cause at least one of the one or more processors to:

authenticate the server-side apparatus with an authorization entity, the authorization entity being external to the server-side apparatus;

receive a request to render content from a client device associated with a user;

transmit, to the authorization entity, a request to provide the Web service;

receive an authorization from the authorization entity to provide the Web service in response to a determination by the authorization entity that the user is authorized to use the Web service to render the content;

receive rights expression information associated with content, the rights expression information including conditions of use of the content;

interpret the rights expression information; and provide the content to the client device for consumption of the content based on the rights expression information.

7. The server-side apparatus of claim 6, wherein the rights expression information is expressed using a rights expression language.

8. The server-side apparatus of claim 7, wherein the rights expression language is a grammar-based rights expression language.

9. The server-side apparatus of claim 8, wherein the grammar-based rights expression language includes eXtensible rights Markup Language (XrML).

10. The server-side apparatus of claim 6, wherein the instructions that cause at least one of the one or more processors to provide the content to the client device for consumption further cause at least one of the one or more processors to transmit the content to the client device.

11. At least one non-transitory computer-readable medium storing computer-readable instructions that, when executed by one or more server-side computing devices, cause at least one of the one or more server-side computing devices to:

authenticate at least one of the one or more server-side computing devices with an authorization entity, the authorization entity being external to the one or more server-side computing devices;

receive a request to render content from a client device associated with a user;

transmit, to the authorization entity, a request to provide a Web service;

receive an authorization from the authorization entity to provide the Web service in response to a determination by the authorization entity that the user is authorized to use the Web service to render the content;

receive rights expression information associated with content, the rights expression information including conditions of use of the content;

interpret the rights expression information; and provide the content to the client device for consumption of the content based on the rights expression information.

12. The at least one non-transitory computer-readable medium of claim 11, wherein the rights expression information is expressed using a rights expression language.

13. The at least one non-transitory computer-readable medium of claim 12, wherein the rights expression language is a grammar-based rights expression language.

14. The at least one non-transitory computer-readable medium of claim 13, wherein the grammar-based rights expression language includes eXtensible rights Markup Language (XrML).

15. The at least one non-transitory computer-readable medium of claim 11, wherein the instructions that cause at least one of the one or more server-side computing devices to provide the content to the client device for consumption further cause at least one of the one or more server-side computing devices to transmit the content to the client device.

* * * * *